United States Patent
Ning et al.

(10) Patent No.: US 9,061,943 B2
(45) Date of Patent: Jun. 23, 2015

(54) METHOD FOR METALLIZING CERAMIC SURFACE AND METHOD FOR CONNECTING CERAMIC WITH ALUMINUM

(75) Inventors: Xiaoshan Ning, Beijing (CN); Bo Wang, Beijing (CN); Sha Li, Beijing (CN); Guocai Li, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 445 days.

(21) Appl. No.: 13/318,332

(22) PCT Filed: Apr. 30, 2010

(86) PCT No.: PCT/CN2010/000612
§ 371 (c)(1),
(2), (4) Date: Jan. 6, 2012

(87) PCT Pub. No.: WO2010/124532
PCT Pub. Date: Nov. 4, 2010

(65) Prior Publication Data
US 2012/0121896 A1     May 17, 2012

(30) Foreign Application Priority Data

Apr. 30, 2009  (CN) .......................... 2009 1 0083280
Sep. 16, 2009  (CN) .......................... 2009 1 0092748
Oct. 10, 2009  (CN) .......................... 2009 1 0235666

(51) Int. Cl.
*C23C 2/12*   (2006.01)
*C04B 37/00*  (2006.01)
(Continued)

(52) U.S. Cl.
CPC ........... *C04B 37/006* (2013.01); *Y10T 428/265* (2015.01); *C23C 2/12* (2013.01);
(Continued)

(58) Field of Classification Search
CPC ........................................................ C23C 2/12
See application file for complete search history.

(56) References Cited

U.S. PATENT DOCUMENTS

| | | | | |
|---|---|---|---|---|
| 3,533,824 A | * | 10/1970 | Terrill et al. | 428/639 |
| 6,617,044 B2 | * | 9/2003 | Nishiuchi et al. | 428/553 |
| 2008/0292816 A1 | * | 11/2008 | Franchet et al. | 427/598 |

FOREIGN PATENT DOCUMENTS

| CN | 1199101 A | 11/1998 |
|---|---|---|
| CN | 1066494 C | 5/2001 |

(Continued)

OTHER PUBLICATIONS

International Search Report issued on Aug. 19, 2008 for International Application No. PCT/CN2010/000612.

*Primary Examiner* — David Turocy
(74) *Attorney, Agent, or Firm* — Knobbe, Martens, Olson & Bear, LLP

(57) ABSTRACT

A process for metalizing a ceramic surface or attaching a ceramic to a metal is provided. The process may comprise: immersing the ceramic into an aluminum or aluminum alloy melt, making the ceramic move or stay still relative to the melt to adhere the melt to the ceramic; and then removing the ceramic from the melt to unaffectedly cool the film adhered thereto. The process can attach an aluminum or aluminum alloy thin film having a thickness of several to tens of micrometers on a ceramic surface. The thin film is formed by solidification, and does not have microscopic faults such as oxide film inclusions or pores, therefore having proper physical of mechanical properties of aluminum. Ceramics or a ceramic and a metal can be brazed via the surface metalizing film, the bonding strength of their interface can over the strength of aluminum itself.

19 Claims, 2 Drawing Sheets

(51) Int. Cl.
    *C04B 37/02*     (2006.01)
    *C04B 41/00*     (2006.01)
    *C04B 41/51*     (2006.01)
    *C04B 41/88*     (2006.01)

(52) U.S. Cl.
    CPC ............ *C04B 37/026* (2013.01); *C04B 41/009* (2013.01); *C04B 41/5155* (2013.01); *C04B 41/88* (2013.01); *C04B 2235/656* (2013.01); *C04B 2235/658* (2013.01); *C04B 2235/6581* (2013.01); *C04B 2235/96* (2013.01); *C04B 2237/121* (2013.01); *C04B 2237/126* (2013.01); *C04B 2237/128* (2013.01); *C04B 2237/343* (2013.01); *C04B 2237/365* (2013.01); *C04B 2237/366* (2013.01); *C04B 2237/40* (2013.01); *C04B 2237/402* (2013.01); *C04B 2237/592* (2013.01); *C04B 2237/708* (2013.01)

(56) References Cited

FOREIGN PATENT DOCUMENTS

| | | |
|---|---|---|
| CN | 101538166 A | 9/2009 |
| CN | 101538171 A | 9/2009 |
| EP | 676800 A2 * | 10/1995 |
| JP | 2006161158 A | 6/2006 |

\* cited by examiner

METHOD FOR METALLIZING CERAMIC SURFACE AND METHOD FOR CONNECTING CERAMIC WITH ALUMINUM

RELATED APPLICATIONS

This application is a U.S. National Phase of International Application No. PCT/CN2010/000612, filed Apr. 30, 2010, designating the U.S., and published in Chinese as WO 2010/124532 on Nov. 4, 2010 which claims the benefit of Chinese Patent Application No. CN 200910083280.6 filed Apr. 30, 2009, CN 200910092748.8 filed Sep. 16, 2009, and CN 200910235666.4 filed Oct. 10, 2009.

TECHNICAL FIELD

This invention involves in the surface metallization of ceramics and the attachment of ceramics with aluminum.

BACKGROUND OF THE INVENTION

Ceramics have a good thermal conductivity and an insulation property, and they are good packaging materials. Generally in the usage, the surface metallization of ceramics is required for fabricating electronic circuits or filler metal electronic components. In addition, as the result of the brittleness and the difficulty for machining, a ceramic needs to be attached with a metal to make composite materials or components in many cases.

Traditional processes of surface metallization comprise a noble metal process and a Mo—Mn process. The noble metal process first mix noble metals powder, such as silver powder or palladium powder with glass powder, binder and solvent to form a slurry and then to coat it on a surface of a ceramic, and then to sinter it on the surface of the ceramic to form a noble metal film by heating to a temperature about 900° C. to melted the glass. The Mo—Mn method is to mix molybdenum powder and manganese oxide powder to make a slurry and to coat it on a surface of a ceramic, and then to sinter a molybdenum metal on the ceramic by forming a combined oxide of manganese and the ceramic at a temperature of about 1500° C. The former uses expensive raw materials, and the bonding strength is lower, therefore, is generally used in making electronic conducting film; the latter has a higher bonding strength between the metal film and the ceramic, because that molybdenum has a thermal expansion coefficient near that of ceramics and therefore has a lower thermal stress after sintering. Thus besides the usage for making electronic conducting film, the molybdenum metal film on the surface can also be used for the brazing of ceramics with metal, by using the commonly used brazing alloy.

In addition to the Mo—Mn metallization/brazing process, the commonly used processes for bonding ceramics with metals also comprise a DBC process and an active-metal-brazing process. The DBC process first laminates an oxygen-containing copper plate or a surface-oxidized copper plate on a ceramic plate and then heat to about 1070° C. in an inert atmosphere to form a Cu—$Cu_2O$ eutectic melt on the surface of copper, to attach the ceramic with the copper plates by using the melt as brazing filler. The active-metal-brazing process first mixes silver, copper, and titanium powder to make slurry and then coats on the ceramic surface before laminating copper or special steel or other metal materials/components. Then the ceramic and metal materials or components are brazed together by heating to about 850° C. in a vacuum atmosphere, to have the silver-copper-titanium filler melted. The DBC process is mainly used for making composite circuit boards of ceramics and copper (Due to the large difference of thermal expansion coefficient between ceramics and copper, and the thermal stress developed in the composite, which can be large enough to cause the fracture of ceramics, the thickness and shape of copper are strictly restricted). The active-metal-brazing process is more widely used in the manufacturing of ceramic-metal composite components, owing to that a varieties of metals can be brazed, and the thermal stress can be decreased by brazing a metal having a thermal expansion coefficient near that of ceramics: such as composite circuit boards of ceramics and copper, automotive turbocharger rollers and engine tappets. The Mo—Mn process is also widely used in the manufacturing of the ceramic cases of silicon rectifiers and the bonding of metal electrodes.

Aluminum is a kind of metal materials whose in-use amount is only second to steel. Owing to the chemical activity of aluminum itself, aluminum can react directly with ceramics to bond on ceramics theoretically. Furthermore, as the yield strength of aluminum is relatively low, the thermal stress in the ceramics-metal composite can be relieved by plastic deformation. Therefore, the bonding of aluminum and ceramic has a broad prospect. However, due to the impediment of primary oxide film on the surface of aluminum, the bonding of ceramics and aluminum is difficult.

At present, many researches on the bonding of ceramics and aluminum have been executed, and a lot of bonding processes have been developed. Such as a vacuum brazing process, a solid phase diffusion bonding process, a friction welding process, a high-vacuum cleaning/pressing process and an ultrasonic vibration bonding process. The vacuum brazing process is to place aluminum alloy filler metal with a low melting point between a ceramic and aluminum, and then to heat in a nitrogen or other inert gases atmosphere, or in a high vacuum atmosphere with a vacuum higher than $10^{-3}$ Pa to melt the filler metal so as to bond the ceramics and aluminum together. The solid phase diffusion bonding process is basically the same as the vacuum brazing process. The difference is that no filler metal is used and the bonding is conducted at a temperature below the melting point of aluminum. Since no liquid is produced in the bonding process, a large enough pressure is necessary so that the surfaces of aluminum and a ceramic can be contacted with each other. Although aluminum and ceramics can be bonded by using these processes, but owing to that the chemical property of aluminum is extremely active, and its equilibrium partial pressure at a temperature lower than 1.000° C. is less than $10^{-40}$ Pa, the oxidation of aluminum cannot be avoided even in the presently available maximum vacuum conditions. An amorphous aluminum oxide film always exists at the bonding interface of a ceramic and aluminum. As a result, a large number of defects are formed at the bonding interface, leading to a rather bad or a fluctuated mechanical property of the bond, which in turn hinders the application of these processes. [X. S. Ning. T. Okamoto, Y. Miyamoto, A. Koreeda. K. Suganuma, and S. Goda, Bond strength and interfacial structure of silicon nitride joints brazed with aluminum-silicon and aluminum-magnesium alloys. Journal of Materials Science. Volume 26 (1991) 2050-2054; E. Saiz; A. P. Tomsia; K. Sugamuma, Wetting and strength issues at Al/α-alumina interfaces, Journal of European Ceramic Society. Volume 23 (2003) 2787-2796].

The friction pressing or the ultrasonic vibration pressing, or the ultra-high vacuum cleaning/pressing processes are developed for eliminating the effects of oxide film. The friction pressing process is to remove the surface oxide film of aluminum by mutual grinding of the surfaces of a ceramic and an aluminum part under pressure, and then use the heat generated by the friction to press aluminum and the ceramic to bond with each other. The basic principle of ultrasonic vibration pressing is just the same as friction pressing. The difference is that the friction is generated by the ultrasonic vibration in the ultrasonic vibration pressing process. Ultra-high vacuum cleaning/pressing process is first to removes the oxide film on the surface of aluminum by ion bombardment in a vacuum environment, and then to presses aluminum and ceramics together in $10^{-6}$ Pa ultra-high vacuum environment to bond them. Although these processes can more or less remove the oxide film on the surface of aluminum and can improve the performance of the bonding interface of aluminum and ceramics, a large pressure need to be applied during the bonding processes, which results in the distortion of aluminum part. In addition, the shape of the metal or ceramic parts is strictly limited.

If an aluminum film can be formed on the surface of a ceramic, the bonding of a ceramic to aluminum will be transformed to the bonding of aluminum themselves. Thus, the well-developed techniques for the brazing of aluminum can be used to the bonding of the ceramics and aluminum. However, the formation of aluminum film on the surface of ceramics is rather a difficult problem. Efforts have been made to form an aluminum film on the surface of alumina by using a process of vacuum evaporation, and a magnetron sputtering or a molecular beam epitaxy process, but it is found that a continuous aluminum film cannot be formed on the surface of alumina. Furthermore, as the temperature of the alumina substrate is kept at a temperature near room temperature, the aluminum vapor deposits rapidly on the alumina substrate, but deposits to many isolate islands; but if the temperature of the substrates exceeds the melting point of aluminum, no aluminum can be deposited on alumina. [G. Dehm, B. J. Inkson. T. Wagner. Growth and micro-structural stability of epitaxial Al films on (0001) $\alpha$-$Al_2O_3$ substrates. Acta Mater., volume 50 (2002)5021-32; M. Vermeersch, F. Malengreau. R. Sporken. R. Caudano, The aluminium/sapphire interface formation at high temperature: an AES and LEED study, Surf. Sci., Volume 323 (1995) 175-187.] This is because that the wettability of aluminum with ceramics is relatively poor, (currently most of the measured wetting angles are larger than 75°). According to the theory, a substance whose wetting angle to a substrate is larger than zero actually cannot form a continuous film on the substrate. By the way, the unbond-defects generally form at the brazing interface of ceramics and aluminum can also be related to the fact that aluminum cannot spread over the surface of ceramics.

SUMMARY OF THE INVENTION

The applicants have carried out extensive research in order to form a continuous film of aluminum or aluminum alloy on the surface of ceramics. Eventually it was found that by immersing a ceramic plate into an aluminum or an aluminum alloy melt and moving in it, and at last removing it out, and then cool it unaffectedly in an atmosphere containing a certain amount of oxygen, a layer of aluminum or aluminum alloy film with a thickness from one micrometer to tens of micrometers could be formed on the surface of ceramics, thus a ceramic with its surface being coated with aluminum or aluminum alloys could be obtained. Furthermore, the applicants also performed some experiments on the bonding of ceramics and aluminum by applying the aluminum or aluminum alloys film attached on the surface of the ceramics, and found that aluminum and ceramics can be bonded tightly by adopting this method. The applicants also found that if the metallization film was made of a lower melting point aluminum alloy, the metallization film could be used directly as filler metal to braze a ceramic with aluminum or an aluminum alloy. According to the principles listed above, the applicants also developed a ceramic surface metallization and brazing equipment, which can realize a continuous and a high-performance brazing of ceramics and aluminum and finally accomplished the invention.

One objective of the invention is to provide a process for attaching an aluminum or aluminum alloy film on the surface of a ceramic.

The process provided by the present inversion for attaching an aluminum or aluminum alloy thin film to a ceramic surface comprises the steps of: immersing a ceramic surface to be metalized into a aluminum or aluminum alloy melt, and making the ceramic move or stay still relative to the melt to adhere the melt of the aluminum or aluminum alloy to the metalizing surface of the ceramic; and then removing the metalizing surface of the ceramic from the melt to unaffectedly cool the aluminum or aluminum alloy liquid film adhered thereto to obtain a ceramic having the aluminum or aluminum alloy thin film attached to the surface.

The process provided by the present invention for attaching an aluminum or aluminum alloy thin film to a ceramic surface, is as follows: immersing a ceramic surface to be metalized into a aluminum or aluminum alloy melt, and making the ceramic move relative to the melt for eliminating the oxide film on the surface of aluminum melt, and making the metalizing surface stay still in aluminum of aluminum alloy melt for a certain time if necessary, to adhere aluminum or aluminum alloy melt on the surface, and then removing the metalizing surface of the ceramic from the melt to unaffectedly cool the adhered aluminum or aluminum alloy liquid film without any constrains, and to obtain a ceramic whose surface is bonded with a 1 micrometer to tens micrometers thick dense aluminum or aluminum alloy film.

Just as the process mentioned above, the method for immersing of immersing the metalizing surface of the ceramic into the aluminum or aluminum alloy melt comprises inserting the ceramic into a vessel containing the aluminum or aluminum alloy melt from the bottom thereof and then moving the ceramic upward vertically.

The process mentioned above characterizes in that the aluminum or aluminum alloy melt has a temperature selected from 1) or 2) below:

1) the aluminum or aluminum alloy melt has a temperature of 630° C.-850° C., or 700° C.-850° C., or 680° C.-780° C., or 700° C.-760° C., and particularly, 630° C., 680° C., 700° C., 730° C., 760° C., 780° C. or 850° C.;

2) the aluminum or aluminum alloy melt has a temperature of 730° C.-820° C. or 760° C.-820° C. or 780° C.-820° C. or 730° C.-760° C. or 730° C.-780° C. or 760° C.-820° C. or 760° C.-780° C., and particularly, 730° C., 760° C., 780° C. or 820° C.

The process mentioned above characterizes in that the method to make the ceramic move or stay still relative to the melt comprises 1) or 2) or 3) below:

1) in the movement relative to the melt, a speed of moving relative to the melt is 68.5 mm/min, and a speed of removing the metalizing surface of the ceramic from the melt is 68.5 mm/min; and In the staying still relative to the melt, a time for staying still relative to the melt is 10 min. and a speed of removing the metalizing surface of the ceramic from the melt is 10 mm/min:

2) in the movement relative to the melt, a speed of moving relative to the melt is 10-68.5 mm/min. and a speed of removing the metalizing surface of the ceramic from the melt is 10-68.5 mm/min:

in the staying still relative to the melt, the time for staying still relative to the melt is 5-60 min or 5-30 min or 30 min-60 min; and particularly 5 min. 30 min or 60 min;

the mentioned speed of removing the metalizing surface of a ceramic from melt is 274 mm/min:

3) in the movement relative to the melt, a speed of moving relative to the melt is 10-68.5 mm/min, and particularly, 10 mm/min or 68.5 mm/min; and a speed of removing the metalizing surface of the ceramic from the melt is 10-68.5 mm/min. and particularly, 10 mm/min or 68.5 mm/min; and in the staying still relative to the melt, a time for staying still relative to the melt is 5-60 min or 5-30 min or 10-60 min, and particularly, 5 min, 10 min. 30 min or 60 min; and a speed of removing the metalizing surface of the ceramic from the melt is 10-274 mm/min, and particularly, 10 mm/min or 274 mm/min.

The process mentioned above characterizes in that the process is conducted in the atmosphere as described in 1), 2) or 3) below:

1) vacuum, about $10^{-3}$ Pa order;
2) inert gas:
3) inert gas with oxygen, wherein the oxygen has an amount of, by volume. 3 ppm-1300 ppm, or 3 ppm-700 ppm, or 3 ppm-420 ppm, or 3 ppm-110 ppm, or 10 ppm-420 ppm, or 10 ppm-700 ppm, or 110 ppm-420 ppm, or 110 ppm-700 ppm, or 420 ppm-1300 ppm, and particularly, 3 ppm, 10 ppm, 110 ppm, 420 ppm, 700 ppm or 1300 ppm; wherein ppm refers to parts per million:

or the inert gas is nitrogen.

The process mentioned above characterizes in that the aluminum alloy is Al-8 wt % Si, Al-12 wt % Si, Al-2 wt % Si, Al-1 wt % Si or Al-12 wt % Si-1 wt % Mg.

The process mentioned above characterizes in that the ceramic is oxide ceramic, nitride ceramic or carbide ceramic; or, the oxide ceramic is an alumina ceramic plate, the nitride ceramic is an aluminum nitride ceramic plate or silicon nitride ceramic plate, the carbide ceramic is a silicon carbide ceramic plate.

The process mentioned above characterizes in that the aluminum or aluminum alloy thin film has a thickness as specified in 1), or 2), or 3) below:

1) 4 μm-51 μm, or 5 μm-17 μm, or 6 μm-10 μm, or 7 μm-9 μm, or 8 μm-17 μm, or 8 μm-10 μm, or 10 μm-17 μm, and particularly, 4 μm, 5 μm, 6 μm, 7 μm, 8 μm, 9 μm, 10 μm, 17 μm or 51 μm;

2) 1 μm-7 μm, or 1 μm-5 μm, or 1 μm-3 μm, or 1 μm-4 μm, or 2 μm-7 μm, or 2 μm-5 μm, or 2 μm-4 μm, or 3 μm-5 μm, or 3 μm-7 μm, or 4 μm-7 μm, and particularly, 1 μm, 2 μm, 3 μm, 4 μm, 5 μm or 7 μm;

3) 1 μm-51 μm, or 2 μm-17 μm, or 3 μm-10 μm, or 4 μm-9 μm, or 5 μm-8 μm, or 8 μm-17 μm, or 8 μm-10 μm, or 10 μm-17 μm, and particularly, 1 μm, 2 μm, 3 μm, 4 μm, 5 μm, 7 μm, 6 μm, 8 μm, 9 μm, 10 μm, 17 μm or 51 μm.

A ceramic having an aluminum or aluminum alloy thin film attached to the surface thereof, obtained by the process mentioned above is also the invention of the patent, which characterizes in that the interface between the ceramic and the aluminum or aluminum alloy thin film has no impurity of amorphous oxide of aluminum.

Another aim of the present invention is to provide a ceramic whose surface is attached with an aluminum or aluminum alloy film.

The ceramic having an aluminum or aluminum alloy thin film attached to the surface thereof, provided by the present invention, characterizes in that the aluminum or aluminum alloy thin film is formed by solidification of the aluminum or aluminum alloy liquid film adhered evenly on the ceramic, and has a thickness from several micrometers to tens of micrometers. The aluminum or aluminum alloy film is formed by the non-restricted unaffected solidification of the continuous aluminum of aluminum alloy liquid film adhered on the ceramic, and its thickness is between 1-10 μm.

The ceramic having an aluminum or aluminum alloy thin film attached to the surface thereof as mentioned above characterizes in that an interface between the ceramic and the aluminum or aluminum alloy thin film has no impurity of amorphous oxide of aluminum, and the aluminum or aluminum alloy reacts with the ceramic directly to grow into each other.

The ceramic having the aluminum or aluminum alloy thin film attached to the surface thereof as mentioned above characterizes in that the peel strength via a chessboard division between the aluminum or aluminum alloy thin film and the ceramic is more than 4.1 N/cm.

The ceramic having the aluminum or aluminum alloy thin film attached to the surface thereof as mentioned above characterizes in that the aluminum comprises the commercially pure aluminum; and the aluminum alloy comprises aluminum-silicon binary alloy and aluminum-silicon-magnesium ternary alloy.

The second objective of the invention is to provide a process for bonding a metal to a ceramic, comprising the steps of: 1) on a surface of the ceramic for attaching, forming a dense aluminum or aluminum alloy thin film with a thickness from several micrometers to tens of micrometers, to obtain a ceramic having the surface for bonding covered by the aluminum or aluminum alloy thin film; 2) bonding the ceramic having the surface for bonding covered by the aluminum or aluminum alloy thin film to a metal by using the aluminum or aluminum alloy thin film, or bonding the ceramic having the surface for bonding covered by the aluminum or aluminum alloy thin film to each other by using the aluminum or aluminum alloy thin film.

The process mentioned above characterizes in that in the step 1), on the surface of the ceramic for bonding, forming a dense aluminum or aluminum alloy 1 thin film with the thickness from several micrometers to tens of micrometers to obtain a ceramic covered with a thin film of aluminum or aluminum alloy 1; 2) bonding the ceramic covered with aluminum or aluminum alloy 1 with each other or bonding the ceramic covered with a thin film of aluminum or aluminum alloy with aluminum or aluminum alloy 2, in a vacuum or an inert gas atmosphere by adopting the conventional brazing process of aluminum or aluminum alloy. In order to prevent the distortion or melting down of an aluminum or aluminum alloy 2 part, the melting temperature of aluminum alloys 2 must be higher than the melting temperature of aluminum alloy 1, and the brazing temperature must be controlled to be higher than the melting temperature of aluminum alloy 1 and lower than the melting point or the melting temperature of aluminum and aluminum 2 (that is, the brazing temperature is higher than the melting temperature of aluminum alloy 1 and lower than the melting point of pure aluminum, or the brazing temperature is higher than the melting temperature of aluminum alloy 1 and lower than the melting temperature of aluminum alloy 2).

The step 1) in the process for bonding a ceramic with a metal as mentioned above, or the process to form a dense aluminum or aluminum alloy thin film with a thickness of several micrometers to tens micrometers on the bonding surface of a ceramic comprises the steps of: immersing the surface of the ceramic for bonding into a aluminum or aluminum alloy melt and making the ceramic move and/or stay still relative to the melt to enable the bonding surface of the ceramic to be wetted by the melt; then removing the bonding surface of the ceramic from the melt and cooling down to unaffectedly solidify the aluminum or aluminum alloy liquid film adhered on the surface of the ceramic to form an aluminum or aluminum alloy thin film.

The step 2) in the process for bonding a ceramic with a metal as mentioned above is conducted by the following procedures described in I, or II, or III, or IV: I, the step 2) is conducted by the process including the following steps: placing a brazing filler metal on the aluminum or aluminum alloy thin film of the ceramic having the surface for bonding covered by aluminum or aluminum alloy thin film, then placing the metal on the filler metal, brazing to bond the metal to the ceramic having the surface for bonding covered by the aluminum or aluminum alloy thin film: II, the step 2) is conducted by the process including following steps: placing a brazing filler on the aluminum or aluminum alloy thin film of the ceramic having the surface for attaching covered by aluminum or aluminum alloy thin film, then placing a ceramic having the surface for attaching covered by aluminum or aluminum alloy thin film on the brazing filler, brazing to bond the ceramics having the surface for attaching covered by the aluminum or aluminum alloy thin film to each other: III, the step 2) is conducted by the process including the following steps: using the aluminum or aluminum alloy thin film as brazing filler to bond the ceramic having the surface for attaching covered by the aluminum or aluminum alloy thin film to a metal; IV, the step 2) is conducted by the process including following steps: using the aluminum or aluminum alloy thin film as brazing filler to bond the ceramic having the surface for attaching covered by the aluminum or aluminum alloy thin film to each other.

The process mentioned above characterizes in that the step 1) is conducted in the atmosphere specified in a) or b) below:
a) an atmosphere having an oxygen content of 3 ppm-1300 ppm by volume, and particularly, the oxygen content is 3 ppm, 30 ppm or 1300 ppm by volume, wherein ppm refers to part per million;
b) an inert gas atmosphere, having an oxygen content of 3 ppm-1300 ppm, or 3 ppm-700 ppm, or 3 ppm-420 ppm, or 3 ppm-110 ppm, or 10 ppm-420 ppm, or 10 ppm-700 ppm, or 110 ppm-420 ppm, or 110 ppm-700 ppm, or 420 ppm-1300 ppm, and particularly, 3 ppm, 10 ppm, 110 ppm, 420 ppm, 700 ppm or 1300 ppm, by volume: wherein ppm refers to part per million;
or the inert gas is nitrogen.

The process mentioned above characterizes in that in the step 1), the aluminum or aluminum alloy melt has a temperature specified in a) or b) or c) or d) or e) below:
a) the temperature of the aluminum melt is higher than the melting point of the aluminum and lower than 950° C., 850° C. or 750° C.;
b) the temperature of the molten aluminum alloy liquid is higher than melting temperature of the aluminum alloy and lower than 950° C., 850° C. or 750° C.;
c) the temperature of the aluminum or aluminum alloy melt is 600° C.-850° C. or 600° C.-700° C. or 600° C.-685° C. or 660° C.-850° C. or 660° C.-700° C. or 685° C.-850° C., and particularly, 600° C., 660° C., 685° C., 700° C. or 850° C.;
d) the temperature of the aluminum melt is 685° C.-850° C., and particularly, 685° C., 700° C. or 850° C.;
e) the temperature of the molten aluminum alloy liquid is 580° C.-660° C. or 600° C.-660° C. and particularly, 660° C. or 600° C. The eutectic temperature of aluminum-silicon binary alloy is 580° C.

The process mentioned above characterizes in that in the step 1), the method of making the ceramic move and/or stay still relative to the melt comprises a) or b) or c) or d) or e) below:
a) the time for its moving and/or staying still relative to the melt is 1-60 mins;
b) the speed for removing the attaching surface of the ceramic from the melt is 10-150 mm/min;
c) the time for its moving and/or staying still relative to the melt is 1.60 mins; and a speed for removing the surface for attaching of the ceramic from the melt is 10-150 mm/min;
d) in the movement relative to the melt, a speed of moving relative to the melt is 10-150 mm/min, and particularly, 10 mm/min. or 68.5 mm/min, or 150 mm/min; and a speed of removing the surface for attaching of the ceramic from the melt is 10-150 mm/min, and particularly, 10 mm/min. or 68 mm/min. or 150 mm/min:
e) in the staying still relative to the melt, a time for staying still is 3 min-58 min, and particularly, 3 min or 58 min; and the speed for removing the surface for attaching of the ceramic from the melt is 68.5 mm/min.

The process for the bonding of a ceramic to metal characterizes in that in the step 1), the ceramic is an oxide ceramic, a nitride ceramic or a carbide ceramic; or, the oxide ceramic is an alumina ceramic plate, the nitride ceramic is an aluminum nitride ceramic plate or a silicon nitride ceramic plate, the carbide ceramic is a silicon carbide ceramic plate;

and the ceramics bonded can be the same of different ceramics:

The process for the bonding of a ceramic to metal characterizes in that in the step 1), the aluminum alloy is Al-2 wt % Si or Al-12 wt % Si:

The process for the bonding of a ceramic to metal characterizes in that in the step 1), the said several micrometers to tens of micrometers are 2-17 micrometers, or 8-17 micrometers, or 8-10 micrometers, or 10-17 micrometers, or 2-10 micrometers, and particularly, 2 micrometers, 8 micrometers, 10 micrometers or 17 micrometers.

The process for the bonding of a ceramic to metal characterizes in that in the step 2), the temperature for the brazing is 600° C.-650° C. or 600° C.-640° C. or 630° C.-650° C., and particularly, 600° C., 630° C., 640° C. or 650° C.:

The process for the bonding of a ceramic to metal characterizes in that in the step 2), in the process I or II, the brazing filler metal is Al-12 wt % Si alloy, Al-8 wt % Si alloy, Al-4 wt % Si alloy. Al-8 wt % Si-0.2 wt % Mg alloy or aluminum:

The process for the bonding of a ceramic to metal characterizes in that in the step 2), the said metal is aluminum, 5A02 aluminum-magnesium alloy or 2A02 aluminum-copper-magnesium alloy:

The process for the bonding of a ceramic to metal characterizes in that in the step 2), the brazing is conducted in a vacuum atmosphere of $10^{-3}$ Pa order or in an inert gas atmosphere.

The third objective of the invention is to provide a novel process to bond ceramics to aluminum or aluminum alloy.

The process for bonding ceramics to aluminum or aluminum alloy comprises the steps of: 1) forming a liquid film of an aluminum alloy 1 on the attaching surface of a ceramic to obtain the ceramic having the surface for attaching covered by the liquid film of the aluminum alloy 1; 2) placing pure aluminum or aluminum alloy 2 on the liquid film of the aluminum alloy 1 of the ceramic having the surface for attaching covered by the liquid film of the aluminum alloy 1, and using the liquid film of the aluminum alloy 1 as brazing filler to braze the ceramic having the surface for attaching covered by the liquid film of aluminum alloy 1 to the pure aluminum or aluminum alloy 2.

In the process for bonding ceramics to aluminum or aluminum alloy, the temperature for brazing is higher than the melting temperature of the aluminum alloy 1 and lower than the melting point of pure aluminum, or a temperature for brazing is higher than melting temperature of the aluminum alloy 1 and lower than melting temperature of the aluminum alloy 2.

In the process for bonding ceramics to aluminum or aluminum alloy, in order to prevent the distortion or melting down of the part of aluminum or aluminum alloy 2, the melting temperature of aluminum alloys 2 must be higher than the melting temperature of aluminum alloy 1, and the brazing temperature must be controlled to be higher than the melting temperature of aluminum alloy 1 and lower than the melting point or the melting temperature of aluminum and aluminum 2.

In the process for bonding ceramics to aluminum or aluminum alloy, the step 1) to form a liquid film of aluminum alloy 1 on the bonding surface of a ceramic comprises the steps of: immersing the surface for attaching of the ceramic into melt of the aluminum alloy 1, and making the ceramic move and/or stay still relative to the melt to adhere the molten liquid to the surface for attaching of the ceramic, then removing the surface for attaching of the ceramic from the melt to attach the liquid film of the aluminum alloy 1 to the surface for attaching of the ceramic.

In the process for bonding ceramics to aluminum or aluminum alloy and in the step 1), in the moving relative to the melt, a speed for the moving relative to the melt is 68.5 mm/min; a speed for removing the surface for attaching of the ceramic from the melt is 68.5 mm/min.

In the step 1) of the process for bonding ceramics to aluminum or aluminum alloy, the temperature of the melt of the aluminum alloy 1 is 730° C.:

In the process for bonding ceramics to aluminum or aluminum alloy, the step 1) is conducted under a nitrogen atmosphere:

In the step 2) of the process for bonding ceramics to aluminum or aluminum alloy, the temperature for brazing is 600° C.-620° C., and particularly, 600° C. or 620° C.

In the process for bonding ceramics to aluminum or aluminum alloy, the said aluminum alloy 1 is aluminum-silicon binary alloy or aluminum-silicon-magnesium ternary alloy; or the aluminum alloy 1 is Al-12 wt % Si alloy or Al-12 wt % Si-0.5 wt % Mg alloy.

In the process for bonding ceramics to aluminum or aluminum alloy, the said ceramic is an oxide ceramic, a nitride ceramic or a carbide ceramic; or, the oxide ceramic is an alumina ceramic plate, the nitride ceramic is an aluminum nitride ceramic plate or a silicon nitride ceramic plate, the carbide ceramic is a silicon carbide ceramic plate.

The last objective of the invention is to provide an apparatus to be used in the bonding of ceramics to metal.

The apparatus consists of a furnace body 1, a furnace cover 2, a graphite crucible 3, a metal resistance wire heater 4 at the lower part, a graphite guide 5, a inert gas inlet 6 at the lower part, a guide window 8, an aluminum strip inlet 10, a guide roller 11, a driving roller 12, a brazed work piece outlet 14, a metal resistance wire heater 15 at the upper part and an inert gas inlet 17 at the upper part;

wherein the graphite crucible is placed at the lower part of the furnace body, the lower metal resistance wire heater is placed around the graphite crucible, both the graphite crucible and the furnace body have a hatch matching to the guide in the bottoms thereof respectively, and two hatches are coaxial; the graphite guide is arranged between the graphite crucible and the furnace body via the hatches, and securely connected with them respectively; the graphite guide is made of two parallel plates with a groove inside thereof for the ceramic plate to pass through, and is arranged with the guide window 8 thereon at a place within the crucible.

The joint between the furnace body and the furnace cover of the apparatus is sealed with silicone.

The applicants of the invention find that the oxygen content in the atmosphere of the furnace used in the experiment has an influence on the degree of surface oxidation of aluminum or aluminum alloy, and finally influences the adhesion and the attachment of the aluminum or aluminum alloy melt. If the oxygen content is too high, the surface of aluminum or aluminum alloy melt will oxidize heavily, and the surface of aluminum contacted with a ceramic will also oxidize at last, to decrease the coverage rate of aluminum or aluminum alloy thin film (the oxide formed on the surface of aluminum or aluminum alloy has an influence on the bonding of aluminum or aluminum alloy to a ceramic). On the other hand, it the oxygen content is too low, the coverage rate of the thin film will also decrease, possibly due to that the decreasing of the content of oxygen in the atmosphere will reduce the amount of the oxygen atoms that adhered on the surface of newly-born aluminum liquid film, which in turn increases of surface tension of the molten aluminum [Pamies A et al., Scripta. Metallurgica, 1984, Vol 18, 869-872], causing the liquid film adhered to the ceramic surface to slide down under the impact of surface tension as the ceramic plate moving from aluminum melt (see FIG. 4: The figure shows the force acted on the liquid film adhered on the surface of a ceramic as the ceramic plate is removed out from aluminum melt, u is the speed of the ceramic plate. Wad expresses the bond force of the interface, $\gamma$ is the surface tension acting on the liquid film. G is the gravity acting on the film). Besides that, as the ceramic plate is removed from melt, the liquid film adhered on the surface will also tend to shrink under surface tension to form droplets, and will slide down under the impact of gravity. The applicants found through experiments that adjusting the oxygen content (i.e. oxygen volume content) to the region of 3-1300 ppm (i.e. 3-1300/million) is conducive to the adherence and attachment of aluminum or aluminum alloy on the ceramics surface.

The applicants also find that although the content of oxygen in vacuum is much low, an aluminum film can be formed on the surface of ceramics in a vacuum of 10-3 Pa order.

The applicants of the invention find that the contacting time of a ceramic with aluminum or aluminum alloy melt will affect the attachment of the melt to the ceramic, thereby affect the coverage rate of aluminum or aluminum alloy film. The lower the temperature of the melt is, and the higher the oxygen content in the atmosphere is, the time needed for attaching will be elongated. Experiments show that, under the conditions of the temperatures and the atmosphere of the invention, the appropriate contacting time is 1-60 minutes (the contacting time includes the time of moving and/or stay still). If the contacting time is too short, a complete attachment cannot be obtained; if the time is too long, the productivity will decrease.

The applicants of the invention also find through study that although the temperature of the melt of aluminum or aluminum alloy does not have any significant effect on the forming of aluminum or aluminum alloy thin film, and the bonding strength of the brazing body in the temperature range adopted in the experiments, the too high temperature will intensify the evaporation of aluminum or aluminum alloy. Therefore, an appropriate temperature of the melt should generally be lower than 950° C., at which the evaporation of aluminum increases greatly; and the most appropriate temperature range should be higher than the melting point of aluminum or the melting temperature of aluminum alloy, and lower than 850° C.

As the thermal shock resistance of ceramics is poorer, and the heating or cooling cannot be too fast, the moving speed of ceramics is limited. If the speed of moving is too fast, the ceramic plate is easy to break; it the speed is too low, the productivity will decrease. Under the experimental conditions of the invention, the appropriate moving speed is 10-274 mm/min. However, it should be pointed out that the upper limit of the moving speed is not absolutely unchangeable. Theoretically, if the length of the cooling region of the apparatus is extended, or the temperature gradient of the cooling region is appropriately controlled, the upper limit of the moving speed can be increased accordingly.

The thickness of the aluminum or aluminum alloy thin film adhered to the surface of a ceramic depends on the moving speed and distance of movement, the viscosity and the density of the melt of aluminum or aluminum alloy, the surface conditions of the ceramic, the binding force of the ceramics with the melt of aluminum or aluminum alloy. It also depends on the sliding of aluminum melt adhered on the surface of a ceramic plate, and the dripping of the liquid film adhered on a ceramic plate (natural dripping under gravity function) and the dripping time. According to the transport theory momentum of a non-slipping interface, the thickness ($\delta$) of the fluid agitated by the moving object (momentum boundary layer) can be related to the relative moving speed V, the moving length L, the viscosity of a fluid ($\eta$) and the density ($\eta$) by the following relation [D. R. Poirier and G. H. Geiger, <<Transport Phenomena in Material Processing>>.

$$TMS, (1994): P62-67]:$$

$$\delta = 5.0 \left[ \frac{\eta L}{\rho V} \right]^{1/2}$$

That is, the thickness is proportional to the square root of the viscosity and the moving length, and inversely proportional to the square root of density and moving speed. This relationship does not account for the sliding and the dripping of the fluid. The thickness of the film will decrease if sliding or dripping occurs accordingly.

From the relationship we can know that although the thickness of the aluminum film obtained in this invention is 1 micron to 51 micrometers, this invention obviously does not limit to the range.

BRIEF DESCRIPTION OF THE FIGURES AND THE DRAWINGS

THE EMBODIMENTS OF THE INVENTION

The experimental methods related in the following embodiments are conventional methods except special explanation.

The materials and reagents used in the following embodiments can be obtained commercially, if not specified else.

The ppm in the following embodiments means a part per million.

Embodiment 1

Attaching Aluminum Thin Film or Aluminum Alloy Thin Film on the Surface of Ceramics The commercially pure aluminum, Al-20 wt % Si alloy, commercially pure magnesium and all of the ceramic materials used in all of the embodiments are obtained commercially. The aluminum alloy is prepared by melting the pure aluminum, the Al-20 wt % Si alloy, and the pure magnesium.

Group of Examples

Figure 1:
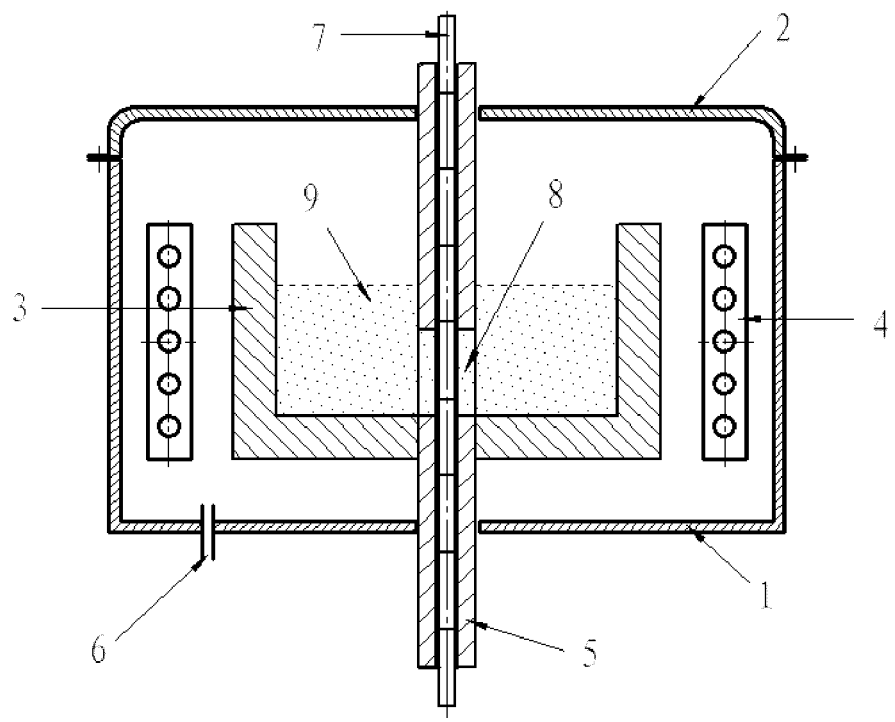
FIG. 1 is a schematic drawing of the structure the ceramic-surface-metallization apparatus used in the example 1 and 2.

The structure of the ceramic-surface-metallization apparatus used in the embodiment is showed in FIG. 1: The apparatus consists of a furnace body 1, a furnace cover 2, a graphite crucible 3, a metal resistance wire heater 4, a graphite guide 5, a nitrogen gas inlet 6; wherein the graphite crucible is placed in the furnace body, the metal resistance wire heater is placed around the graphite crucible, the bottom of the graphite crucible and the furnace body, and the cover have hatches matching to the guide thereof respectively, and the three hatches are coaxial; the graphite guide is arranged among the graphite crucible the furnace cover and the furnace body via the hatches, and securely connected with them respectively; the graphite guide is made of two parallel plates with a groove inside thereof for the ceramic plate to pass through, and a window 8 is opened thereon at a place within the crucible, for the contacting of the melt of aluminum alloy to the ceramic plate 7 inside the groove of the guide; the joint of the furnace body and the furnace cover is sealed by silicone; the inside of the furnace is purged by nitrogen.

The gap between the ceramic plate and the guide under the window is 0.1 mm. This gap size can guarantee the smooth movement of the ceramic plate inside the guide, but aluminum liquid cannot leak out. The gap between the guide and the ceramic plate above the window is 1.3 mm. This gap size can guarantee that the aluminum liquid adhered to the ceramic plate will not contact with the guide so that the aluminum liquid can solidify unaffectedly.

Example 1

The ceramic-surface-metallization apparatus mentioned above was adopted. Pure aluminum (99.9%) was charged into the graphite crucible and alumina ceramic plates (137 mm in length, 35 mm in width, 0.64 mm in thickness, produced by Tsinghua Yueke Com, the purity is greater than 95%) was inserted into the graphite guide traversed through the crucible. Aluminum was heated in a nitrogen atmosphere (the nitrogen flow rate is 20 Liters/min) to melt down and then was heated to 730° C. Another alumina plate was inserted into the guide from the entrance of the guide at the bottom of the apparatus at a speed of 68.5 mm/min, to push the ceramic plates inserted in the guide previously to move vertically at the same speed. During the moving, the ceramic plates contacted with aluminum melt in the crucible through the windows on the guide and then they were pushed out from the upper of the guide together with the aluminum melt adhered on the surface. After cooling, a layer of dense aluminum film formed on both sides of the ceramic plates with a thickness of 6 μm. A micrographic inspection shows that no defects such as oxide inclusion and porosity exists in the aluminum film.

The aluminum film was cut into 1 mm×1 mm chessboard-like pieces with a razor. A strong adhesive tape (3M Corn, with bond strength over 4.1 N/cm) was attached on the chessboard-like pieces of aluminum film and then was torn off fleetly to inspect the adhesive strength of the aluminum film.

The experiment was repeated three times and the results show that the peeling off rate of the pieces was 0, which shows that the aluminum film is firmly bonded to the surface of the alumina plate.

Example 2

The experimental conditions were just the same as experiment 1 except that the temperature of the melt was decreased to 700° C. A dense aluminum film with an average thickness of 7 μm formed on the surface of the ceramic. The peeling off rate of the adhesive tape test was 0. The experiment was repeated three times and the results were same.

Example 3

The experimental conditions were just the same as experiment 1 except that the temperature of the melt was raised to 760° C. A dense aluminum film with an average thickness of 5 μm formed on the surface of the ceramic. The peeling off rate of the adhesive tape test was 0. The experiment was repeated three times and the results were same.

Example 4

A crucible containing pure aluminum was put in a vacuum furnace. After vacuumed to $5×10^{-3}$ Pa, the furnace was electrically heated to 850° C. An alumina ceramic plate was inserted into aluminum melt vertically from the upper side, and was held in aluminum melt for 10 minutes. The ceramic plate was lifted up slowly at a speed of 10 mm/min, and the heating power was shut off to cool down unaffectedly. An aluminum film was attached on a part of the surface of an alumina ceramic dipped in aluminum melt with an average thickness of 10 μm by using this method.

The adhesive tape test specified in example 1 was applied for inspecting the bonding tightness of the aluminum film. The experiment was repeated three times and the peeling off rate is 0, which indicates that the aluminum film attaches tightly to the alumina ceramic plate.

Example 5

Except the usage of aluminum nitride ceramic plate (produced by Fujian Huaqing com., Fujian, China, the content of aluminum nitride is greater than 95%), the others are just the same as example 4. The inspections showed that the average thickness of the aluminum film was 9 μm, and peeling off rate of the aluminum film was 0, which indicates that the aluminum film attaches tightly to the aluminum nitride ceramic plate. The experiment was repeated 3 times and the results were same.

Example 6

Except the usage of silicon nitride ceramic plate (sintered at ordinary pressure, the content of silicon nitride is over 92%), the others are just the same as example 4. The inspections showed that the average thickness of the aluminum film was 9 μm, and peeling off rate of the aluminum film was 0, which indicates that the aluminum film attaches tightly to the silicon nitride ceramic plate. The experiment was repeated 3 times and the results were same.

Example 7

Except the usage of silicon carbide ceramic plate (reactive sintered, the content of silicon carbide is over 90%), the others are just the same as example 4. The inspections showed that the average thickness of the aluminum film was 10 μm, and peeling off rate of the aluminum film was 0, which indicates that the aluminum film attaches tightly to the silicon nitride ceramic plate. The experiment was repeated 3 times and the results were same.

Example 8

Except the change from pure aluminum to an Al-8 wt % alloy, the others are just the same as example 1. An aluminum alloy film, with an average thickness of 8 μm, was formed on the ceramic plates. The adhesive tape test shows that the peeling off rate of the aluminum alloy film is 0, which indicates that the aluminum alloy film attaches tightly to the alumina ceramic plate. The experiment was repeated 3 times and the results were same.

Example 9

Except to decrease the flow rate of nitrogen gas to 15 L/min, the others are just the same as example 8. An aluminum alloy film, with an average thickness of 7 μm, was formed on the ceramic plates, and their peeling off rate of the adhesive tape test is 0. The experiment was repeated 3 times and the results were same.

Example 10

Except to raise the temperature of melt to 780° C., the others are just the same as example 9. An aluminum alloy film, with an average thickness of 6 μm, was formed on the ceramic plates, and their peeling off rate of the adhesive tape test is 0. The experiment was repeated 3 times and the results were same.

Example 11

Except the change from pure aluminum to an Al-12 wt % alloy, the others are just the same as example 1. An aluminum alloy film, with an average thickness of 5 μm, was formed on alumina ceramic plates, and their peeling off rate of the adhesive tape test is 0, which indicates that the aluminum alloy film attaches tightly on the alumina ceramic plate. The experiment was repeated 3 times and the results were same.

Example 12

Except to decrease the temperature of melt to 680° C., the others are just the same as example 11. An aluminum alloy film, with an average thickness of 6 μm, was formed on the ceramic plates by this method, and their peeling off rate of the adhesive tape test is 0. The experiment was repeated 3 times and the results were same.

Example 13

Except the change from pure aluminum to an Al-2 wt % alloy, the others are just the same as example 1. An aluminum alloy film, with an average thickness of 8 μm, was formed on the ceramic plates by this method. The adhesive tape test shows that the peeling off rate of the aluminum alloy film is 0. The experiment was repeated 3 times and the results were same.

Example 14

Except the change from pure aluminum to an Al-1 wt % alloy, the others are just the same as example 1. An aluminum alloy film, with an average thickness of 17 μm, was formed on the ceramic plates by this method. The adhesive tape test shows that the peeling off rate of the aluminum alloy film is 0, which indicates that the aluminum alloy film attaches tightly on the alumina ceramic plate. The experiment was repeated 3 times and the results were same.

Example 15

Except to decrease the temperature of melt to 680° C. the others are just the same as example 14. An aluminum alloy film, with an average thickness of 51 μm, was formed on the ceramic plates by using this method. The adhesive tape test shows that the peeling off rate of the aluminum alloy film is 0, which indicates that the aluminum alloy film attaches tightly on the alumina ceramic plate. The experiment was repeated 3 times and the results were same.

Example 16

Except the change from pure aluminum to an Al-2 wt % alloy, the others are just the same as example 12. An aluminum alloy film, with an average thickness of 5 μm, was formed on alumina ceramic plates by using this method. The experiment was repeated 3 times and the results were same.

Example 17

Except to decrease the flow rate of nitrogen gas to half (10 L/min), the others are just the same as example 16. An aluminum alloy film, with an average thickness of 5 μm, was formed on the ceramic plates, and its surface was oxidized slightly. The experiment was repeated 3 times and the results were same.

Example 18

Except to raise the temperature of melt to 730° C., the others are just the same as example 17. An aluminum alloy film, with an average thickness of 6 μm, was formed on the ceramic plates, and its surface was oxidized slightly. The experiment was repeated 3 times and the results were same.

Example 19

Except to raise the temperature of melt to 780° C. the others are just the same as example 17. An aluminum alloy film, with an average thickness of 4 μm, was formed on the ceramic plates, and its surface was oxidized slightly. The experiment was repeated 3 times and the results were same.

Example 20

Except to decrease the temperature of melt to 630° C. the others are just the same as example 17. An aluminum alloy film, with an average thickness of 5 μm, was formed on the ceramic plates, and its surface was oxidized slightly. The experiment was repeated 3 times and the results were same.

Example 21

The experimental methods are just the same as example 1, and the difference is that the sealing of the furnace is improved by changing the size of the hatches of the furnace cover and the furnace body. The volume ratio of oxygen inside the furnace was measured and controlled by using an oxygen gas analyzer. The measure method of the volume ratio of oxygen of the furnace is as following: the gas in the crucible was drawn to an oxygen content analyzer (GNL-600, Yongai com., Shanghai, China) through a stainless steel tube whose inner diameter is 2 mm. In order to avoid the influence on the atmosphere in the furnace when pumping gas (800 ml/min), the gas is pumped back to the furnace after analyzing, through a stainless steel tube. The volume content of oxygen in the furnace was adjusted to 10 ppm (parts per million). By using this method, a dense aluminum film with a thickness of 5 μm is formed on the surface of an alumina ceramic, and its peeling off rate at the adhesive tape test is 0. The experiment was repeated three times and the results are same.

Example 22

Except changing the moving speed of the ceramic plate to 274 mm/min and keeping the ceramic plate stay still for 5 minutes after inserting it in aluminum melt, the others are just the same as example 21. An dense aluminum film, with a thickness of 4 μm, was formed on the surface of an alumina ceramic by using this method, and its peeling off rate at the adhesive tape test is 0. The experiment was repeated three times and the results are same.

Example 23

Except changing the moving speed of the ceramic plate to 10 mm/min. the others are just the same as example 21. An dense aluminum film with a thickness of 7 μm was formed on the surface of an alumina ceramic by using this method, and its peeling off rate at the adhesive tape test is 0. The experiment was repeated three times and the results are same.

Example 24

Except raising the temperature of the melt to 780° C., the others are just the same as example 21. An dense aluminum film with an average thickness of 4 μm was formed on the surface of a ceramic by using this method, and its peeling off rate at the adhesive tape test is 0. The experiment was repeated three times and the results are same.

Example 25

Except raising the temperature of the melt to 820° C., the others are just the same as example 21. A dense aluminum film with an average thickness of 2 μm was formed on the surface of a ceramic by using this method, and its peeling off rate at the adhesive tape test is 0. The experiment was repeated three times and the results are same.

Example 26

Except changing the ceramic plates to aluminum nitride plates (made by Fujian Huaqing com. Fujian, China, the aluminum nitride content is over 95%), the others are just the same as example 22. A dense aluminum film with an average thickness of 1 μm was formed on the surface of the aluminum nitride ceramics by using this method, and its peeling off rate at the adhesive tape test is 0. The experiment was repeated three times and the results are same.

Example 27

Except changing the temperature of the melt to 760° C., the others are just the same as example 26. A dense aluminum film with an average thickness of 1 μm was formed on the surface of the ceramic by using this method, and its peeling off rate at the adhesive tape test is 0. The experiment was repeated three times and the results are same.

Example 28

Except changing the temperature of the melt to 780° C., the others are just the same as example 26. A dense aluminum film with an average thickness of 1 μm was formed on the surface of the ceramic by using this method, and its peeling off rate at the adhesive tape test is 0. The experiment was repeated three times and the results are same.

Example 29

Except changing the temperature of the melt to 820° C., the others are just the same as example 26. A dense aluminum film with an average thickness of 1 μm was formed on the surface of the ceramic by using this method, and its peeling off rate at the adhesive tape test is 0. The experiment was repeated three times and the results are same.

Example 30

Except adjusting the flow rate of nitrogen gas to change the volume ratio of oxygen in the furnace to 700 ppm, the others are just the same as example 26. A dense aluminum film with an average thickness of 1 μm was formed on the surface of the ceramic by using this method, and its peeling off rate at the adhesive tape test is 0. The experiment was repeated three times and the results are same.

Example 31

Except changing the aluminum nitride ceramic to the alumina ceramic, the others are just the same as example 30. A dense aluminum film with an average thickness of 2 μm was formed on the surface of the alumina ceramics by using this method, and its peeling off rate at the adhesive tape test is 0. The experiment was repeated three times and the results are same.

Example 32

Except adjusting the flow rate of nitrogen gas to change the volume ratio of oxygen in the furnace to 110 ppm, the others are just the same as example 31. A dense aluminum film with an average thickness of 3 μm was formed on the surface of the ceramics by using this method, and its peeling off rate at the adhesive tape test is 0. The experiment was repeated three times and the results are same.

Example 33

Except adjusting the flow rate of nitrogen gas to change the volume ratio of oxygen in the furnace to 3 ppm, the others are just the same as example 31. A dense aluminum film with an average thickness of 3 μm was formed on the surface of the ceramics by using this method, and its peeling off rate at the adhesive tape test is 0. The experiment was repeated three times and the results are same.

Example 34

Except raising the temperature of the melt to 820° C. and adjusting the oxygen content in the furnace to 420 ppm, the others are just the same as example 31. A dense aluminum film with an average thickness of 2 μm was formed on the surface of the ceramics by using this method, and its peeling off rate at the adhesive tape test is 0. The experiment was repeated three times and the results are same.

Example 35

Except adjusting the oxygen content in the furnace to 1300 ppm, the others are just the same as example 34. A dense aluminum film with an average thickness of 2 μm was formed on the surface of the ceramics by using this method, and its peeling off rate at the adhesive tape test is 0. The experiment was repeated three times and the results are same.

Example 36

Except keeping the ceramic plates stay still for 30 minutes in aluminum liquid after inserting, the others are just the same as example 22. A dense aluminum film with an average thickness of 4 μm was formed on the surface of the alumina ceramics by using this method, and its peeling off rate at the adhesive tape test is 0. The experiment was repeated three times and the results are same.

Example 37

Except keeping the ceramic plates stay still for 60 minutes in aluminum liquid after inserting, the others are just the same as example 22. A dense aluminum film with an average thickness of 4 μm was formed on the surface of the alumina ceramics by using this method, and its peeling off rate at the adhesive tape test is 0. The experiment was repeated three times and the results are same.

Group of Comparative Examples

Comparative Example 1

Alumina ceramic plates were inserted slowly in air into an aluminum melt heated to 680° C. and then were remove out slowly at a speed of 68.5 mm/min. No molten aluminum could be adhered on the surface of the ceramic plates. The experiment was repeated three times and the results are same. This experiment indicates that under the condition an oxide film exists, aluminum liquid cannot wet the ceramic, and the surface of the ceramic can not adhere molten aluminum.

Comparative Example 2

Hot alumina ceramic plates were inserted into a 680° C. aluminum melt in air then agitated in it. After that, the ceramics were drawn up slowly at a speed of 27 mm/min. By means of this method, some region of a ceramic plate can attach aluminum film, but the surface of the film oxidizes severely. Part of the aluminum film can be tear off easily by hand, which indicates that it does not adhere tightly to the ceramic plates. The peeling off rate at the adhesive tape test was 34%. The experiment was conducted three and the results were basically the same. The peeling off rate was 34%, 27%, 45% respectively. The results indicates that if the native oxide film on the surface of aluminum cannot be removed effectively, the remained oxide film will deteriorate the connection of ceramics with aluminum.

Comparative Example 3

Except raising the temperature to 820° C., the others are just the same as example 33. The aluminum liquid at the central region of a ceramic plate accumulated to some droplets, the color of the ceramic changed from white to grey. The reason should be that the adsorption of the oxygen atoms in the atmosphere on the surface of the aluminum film is more difficult at higher temperature, and the surface tension is relatively high. Under the effect of surface tension, the aluminum film adhered on the surface of the ceramic plate will accumulate and at last slide down.

Comparative Example 4

Except changing the alumina ceramic plates to aluminum nitride ceramic plates, the others are just the same as comparative example 1. No aluminum film is attached on the ceramic plates, indicating that the adhesion force of aluminum liquid to the aluminum nitride ceramics is lower than alumina ceramics.

Comparative Example 5

Except adjusting the flow rate of nitrogen gas to change the volume ratio of oxygen in the atmosphere of the furnace to 1300 ppm, the others are just the same as example 1. The samples obtained have only the central region being attached with aluminum film, and the surface of the aluminum film turns to be black or golden, but the region of the ceramics which was immersed in molten aluminum but did not attach with aluminum film has not any change in color. The reason that no aluminum film was formed at the side region can be attributed to that the oxygen in the atmosphere diffuses along the separating surface of the guide into guide, and oxidizes the aluminum contacted with the ceramic from edges, results in that the aluminum liquid at the side region can not adhere to ceramics.

Comparing with example 35, the aluminum film adhered on ceramic plates obviously become narrow, which indicates that to decrease the temperature will deteriorate the bonding of aluminum liquid to the ceramic plate.

Comparative Example 6

Except adjusting the flow rate of nitrogen gas to change the content of oxygen in the atmosphere of the furnace to 1 ppm, the others are just the same as example 1. The samples obtained have only the edge region being attached with aluminum film. The central region of ceramic plates which was immersed in aluminum melt but did not adhere with aluminum film has a color change. The reason should be that if the oxygen content is too low, the surface tension of the newly formed aluminum liquid film adhered on the surface of ceramics become large, which leads to the accumulation of the aluminum film.

Embodiment 2

Brazing of Ceramics with Ceramics, and Ceramics with Aluminum or Aluminum Alloy

The commercially pure aluminum, 5AO2 aluminum alloy, 2AO2 aluminum alloy, Al-20 wt % Si alloy, commercially pure magnesium and all of the ceramic plates used in the embodiments are obtained commercially. The aluminum alloy used to form liquid film on the faying surface of ceramics is prepared by melting the pure aluminum, the Al-20 wt % Si alloy, and the pure magnesium.

The apparatus for forming aluminum or aluminum alloy thin film on the ceramics surface in the embodiment is same with that in Example 1 of Embodiment 1.

Experiment 1

The ceramic-surface-metallization apparatus mentioned above was adopted. Pure aluminum (99.9%) was charged into the graphite crucible and alumina ceramic plates (137 mm in length, 35 mm in width, 0.64 mm in thickness, produced by Tsinghua Yueke Com., the purity is greater than 95%) was inserted into the graphite guide traversed through the crucible. Aluminum was heated in a nitrogen atmosphere (the nitrogen flow rate is 15 Liters/min and the volume content of oxygen in the atmosphere of the furnace is 30/million (30 ppm)) to melt down and then was heated to 700° C. The height of the molten aluminum was 137 mm. Another alumina plate was inserted into the guide from the entrance of the guide at the bottom of the apparatus at a speed of 68.5 mm/min, to push the ceramic plates inserted in the guide previously to move vertically at the same speed. During the moving, the ceramic plates contacted with aluminum melt in the crucible through the windows on the guide and then they were pushed out from the upper of the guide together with the aluminum melt adhered on the surface. After cooling, a layer of dense aluminum film formed on both sides of the ceramic plates with a thickness of 8 μm. During the process, the contacting time of a ceramic plate with molten aluminum is set to 5 min by adjusting the stay still time in molten aluminum (the time of movement of the ceramic plate relative to aluminum melt is 2 min. and the stay still time is 3 min. and the total contacting time is 5 min in this case). An micrographic inspection shows that no defects such as oxide inclusion or porosity exists in the aluminum film.

The aluminum film was cut into 1 mm×1 mm chessboard-like pieces with a razor. An strong adhesive tape (3M com., with a bond strength over 4.1 N/cm) was attached on the chessboard-like pieces of aluminum film and then was torn off fleetly to inspect the adhesive strength of the aluminum film.

The experiment was repeated three times and the results show that the peeling off rate of the pieces was 0, which indicates that the aluminum film is firmly bonded to the surface of the alumina plate.

A alumina ceramic plate, 45×26 mm in size, whose surface is attached with aluminum film was cut out. Al-12 wt % alloy filler metal, 100 micrometers-thick, was put on the both side of the ceramic plate. The sandwich was put inside two pieces of aluminum plate (50 mm×40 mm×0.5 mm). A 300 g load was applied. The laminated sample was heated to 640° C. for 30 min, and then cool down, to braze aluminum plates on the ceramic plate.

Figure 5:
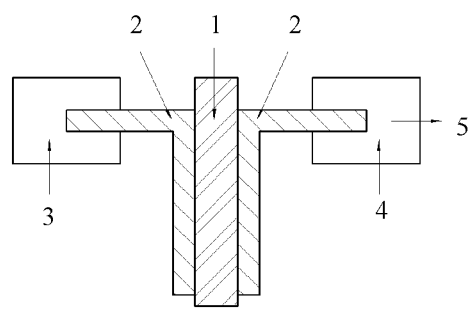
FIG. 5 shows the measurement method of a 90° tear strength.

A metallographic specimen was cut off from the sample by using a diamond cutting machine. The microscopic observation reveals that the aluminum plates are brazed tightly on the ceramic plate, and no unbonded region is found. A 5 mm wide test bar was Cut off from the sample, and a 90° peeling strength test was performed, (as shown in FIG. 5, 1 is the ceramic, 2 is aluminum plate, 3 is a fixed fixture, 4 is a moving fixture, 5 is the direction of the force applied). The peeling strength of the test bar is 10.3 kg/cm, and fracture occurs in the clamping part of aluminum plate, which indicates that the interface bonding strength is larger than 10.3 kg/cm. This result indicates that the ceramic and aluminum can be brazed firmly by adopting the process.

The experiment was repeated three times. The break of the peeling test bars all happened at the clamping part of the aluminum, and the peeling strength measured was 10.3 kg/cm, 11.5 kg/cm, 9.8 kg/cm respectively. Since the break of the test bars did not happen at the interface, the interface bonding strength is at least larger than 9.8 kg/cm.

In the subsequent example, the peeling strength is larger than a certain value means that the value is the smallest one of the values. If the break of the test bar does not occur at the interface, the interface bonding strength will be at least larger than the value.

Experiment 2

Except changing the filler metal to Al-8 wt % Si alloy, the others are just the same as experiment 1. The bonding interface with aluminum has no defects and the fractures during the peeling strength tests happen at the clamping part of aluminum. The experiment was repeated three times and the peeling strength is larger than 10.2 kg/cm, which indicates that the bonding strength of aluminum plate with the ceramic is at least larger than 10.2 kg/cm.

Experiment 3

Except changing the filler metal to Al-4 wt % Si alloy all other experimental conditions are the same with experiment 1. The bonding interface with aluminum has no defects and the fractures during the peeling strength tests happen at the clamping part of aluminum. The experiment was repeated three times and the peeling strength is larger than 9.7 kg/cm, which indicates that the bonding strength of aluminum plate with ceramics is at least larger than 9.7 kg/cm.

Experiment 4

Except changing the filler metal to Al-8 wt % Si-0.2 wt % Mg, all other experimental conditions are the same with experiment 1. The bonding interface with aluminum has no defects and the fractures during the peeling strength tests happen at the clamping part of aluminum. The experiment was repeated three times, and the peeling strength measured is larger than 8.7 kg/cm, which indicates that the bonding strength of aluminum plate with ceramics is at least larger than 8.7 kg/cm.

Experiment 5

Except changing the brazing temperature to 630° C., all other experimental conditions are the same with experiment 1. The bonding interface with aluminum has no defects and the fractures during the peeling strength tests happen at the clamping part of aluminum. The experiment was repeated three times, and the peeling strength is larger than 12.3 kg/cm, which indicates that the bonding strength of aluminum plate with ceramics is at least larger than 12.3 kg/cm.

Experiment 6

Except changing the alumina ceramic plate to aluminum nitride ceramic plate (Produced by Fujian Hualqing Com., the content of aluminum nitride is greater than 95%), all other experimental conditions are the same with experiment 1. The bonding interface with aluminum has no defects and the fractures during the peeling strength tests happen at the clamping part of aluminum. The experiment was repeated three times, and the peeling strength is larger than 9.5 kg/cm, which indicates that the bonding strength of aluminum plate with ceramics is at least larger than 9.5 kg/cm.

Experiment 7

Except changing the alumina ceramic plate to aluminum nitride ceramic plate (sintered at ordinary pressure, the content of aluminum nitride is greater than 92%), all other experimental conditions are the same with experiment 1. The experiment was repeated three times and the fractures during the peeling strength tests all happen at the clamping part of aluminum. The peeling strength is larger than 9.9 kg/cm, which indicates that the bonding strength of aluminum plate with ceramics is at least larger than 9.9 kg/cm.

Experiment 8

Except changing the alumina ceramic plate to silicon carbide ceramic plate (reaction sintering, the content of silicon carbide is greater than 90%), all other experimental conditions are the same with experiment 1.

The experiment was repeated three times. The fractures during the peeling strength tests happen at the clamping part of aluminum. The peeling strength is larger than 11.0 kg/cm, which indicates that the bonding strength of aluminum plate with ceramics is at least larger than 11.0 kg/cm.

Experiment 9

Except changing the aluminum plates to 5A02 aluminum-magnesium alloy plates, all other experimental conditions are the same with experiment 1.

The experiment was repeated three times. No defects are found in the connection interface. The fractures during the peeling strength tests happen at the clamping part of the alloy plate. The peeling strength is larger than 10.6 kg/cm, which indicates that the bonding strength of aluminum plate with ceramics is at least larger than 10.6 kg/cm.

Experiment 10

Except changing the aluminum plate to 2A02 aluminum-copper-magnesium alloy plate, all other experimental conditions are the same with experiment 1.

The experiment was repeated three times. No defects are found in the connection interface. The fractures during the peeling strength tests happen at the clamping part of the alloy plate. The peeling strength is larger than 8.6 kg/cm, which indicates that the bonding strength of aluminum plate with ceramics is at least larger than 8.6 kg/cm.

Experiment 11 Except changing the vacuum environment to inert gas atmosphere by introducing nitrogen into the furnace, all other experimental conditions are the same with experiment 1.

The experiment was repeated three times. No defects are found in the connection interface. The fractures during the peeling strength tests happen at the clamping part of the aluminum plate. The peeling strength is larger than 9.8 kg/cm, which indicates that the bonding strength of aluminum plate with ceramics is at least larger than 9.8 kg/cm.

Experiment 12

Except changing the pure aluminum to Al-2 wt % Si alloy and the temperature of the aluminum melt to 660° C., all other experimental conditions are the same with experiment 1 in the process of forming aluminum alloy film on the faying surface of ceramics. Ceramics coated with an Al-2 wt % Si alloy film is obtained. The process of connecting the ceramics coated with the Al-2 wt % Si alloy film with aluminum is the same with experiment 1. The experiment was repeated three times. Using this method, dense aluminum alloy film with the thickness of 17 μm is formed on the surface of ceramics and the peeling off rate at the peeling off test is 0. No defects are found in the connection interface after brazing and the fractures during the peeling strength tests happen at the clamping part of the aluminum plate. The peeling strength is larger than 9.0 kg/cm, which indicates that the bonding strength of aluminum plate with ceramics is at least larger than 9.0 kg/cm.

Experiment 13

In the process of forming aluminum film on the faying surface of ceramics, except changing nitrogen flow rate to 20 L/min (the oxygen content is 3 ppm in the furnace) and changing the temperature of the molten aluminum to 685° C., all other experimental conditions are the same with experiment 1. Ceramics coated with aluminum film are obtained. The process of connecting the ceramics coated with aluminum film with aluminum is the same with experiment 1. The experiment was repeated three times. Results show that under such conditions, aluminum film does not completely cover on the ceramics surface. The coverage is 71% and the thickness of the aluminum film is 10 μm.

Cut out part of the ceramic plate which is well covered with aluminum film to carry on the checkerboard division peeling strength test and brazing experiment. The experiment was repeated three times and the results show that the peeling off rate at the adhesive tape test is 0. No defects are found in the connection interface after brazing and the fractures during the peeling strength tests happen at the clamping part of the aluminum plate. The peeling strength is larger than 9.3 kg/cm, which indicates that the bonding strength of aluminum plate with ceramics is at least larger than 9.3 kg/cm.

Experiment 14

In the process of forming aluminum film on the connection interface of ceramics, except changing nitrogen flow rate to 3 L/min (the oxygen content is 1300 ppm in the furnace), changing the temperature of the molten aluminum to 850° C., and changing the contacting time of ceramics with molten aluminum to 60 min (the time that the ceramic plate takes to move into and out of the molten aluminum is 2 min, and the stay still time of ceramic plate in molten aluminum is 58 min), all other experimental conditions are the same with experiment 1. Ceramics coated with aluminum film are obtained. The process of connecting the ceramics coated with aluminum film with aluminum is the same with experiment 1. The experiment was repeated three times. Results show that under such conditions, aluminum film does not completely cover on the ceramics surface. The coverage is 83% and the thickness of the aluminum film is 2 μm.

Cut out part of the ceramic plate which is well covered with aluminum film to carry on the checkerboard division adhesive tape test and brazing experiment. The experiment was repeated three times and results show that the peeling off rate in the peeling strength test is 0. No defects are found in the connection interface after brazing and the fractures during the peeling strength tests happen at the clamping part of the aluminum plate. The peeling strength is larger than 9.8 kg/cm, which indicates that the bonding strength of aluminum plate with ceramics is at least larger than 9.8 kg/cm.

Experiment 15

In the process of forming aluminum film on the connection interface of ceramics, except changing the contacting time of ceramics with molten aluminum to 2 min (the ceramic plate moves at the speed of 68.5 mm/min in the molten aluminum and does not stay still in it), all other experimental conditions are the same with experiment 14. The experiment was repeated three times. Results show that under such conditions, aluminum film does not completely cover on the ceramics surface. The coverage is 48% and the thickness of the aluminum film is 2 μm.

Cut out part of the ceramic plate which is well covered with aluminum film to carry on the checkerboard division adhesive tape test and brazing experiment. The experiment was repeated three times and results show that the peeling off rate in the peeling strength test is 0. No defects are found in the connection interface after brazing and the fractures during the peeling strength tests happen at the clamping part of the aluminum plate. The peeling strength is larger than 9.6 kg/cm, which indicates that the bonding strength of aluminum plate with ceramics is at least larger than 9.6 kg/cm.

Experiment 16

In the process of forming aluminum film on the connection interface of ceramics, except changing the moving speed of ceramic plate to 150 mm/s, and changing the contacting time of ceramics with molten aluminum to 1 min (the ceramic plate moves at the speed of 150 mm/min in the molten aluminum and does not stay still in it), all other experimental conditions are the same with experiment 14. Ceramics coated with aluminum film are obtained. The process of connecting the ceramics coated with aluminum film with aluminum is the same with experiment 14. The experiment was repeated three times. Results show that under such conditions, aluminum film does not completely cover on the ceramics surface. The coverage is 43% and the thickness of the aluminum film is 2 μm.

Cut out part of the ceramic plate which is well covered with aluminum film to carry on the checkerboard division adhesive tape test and brazing experiment. The experiment was repeated three times and results show that the peeling off rate in the peeling strength test is 0. No defects are found in the connection interface after brazing and the fractures during the peeling strength tests happen at the clamping part of the aluminum plate. The peeling strength is larger than 10.3 kg/cm, which indicates that the bonding strength of aluminum plate with ceramics is at least larger than 10.3 kg/cm.

Experiment 17

In the process of forming aluminum film on the connection interface of ceramics, except changing the moving speed of ceramic plate to 10 mm/s, all other experimental conditions are the same with experiment 14 (the ceramic plate moves at the speed of 10 mm/min in the molten aluminum and does not stay still in it). Ceramics coated with aluminum film are obtained. The process of connecting the ceramics coated with aluminum film with aluminum is the same with experiment 14. The experiment was repeated three times. Results show that under such conditions, aluminum film does not completely cover on the ceramics surface. The coverage is 89% and the thickness of the aluminum film is 2 um.

Cut out part of the ceramic plate which is well covered with aluminum film to carry on the checkerboard division adhesive tape test and brazing experiment. The experiment was repeated three times and results show that the peeling off rate in the peeling strength test is 0. No defects are found in the connection interface after brazing and the fractures during the peeling strength tests happen at the clamping part of the aluminum plate. The peeling strength is larger than 9.7 kg/cm, which indicates that the bonding strength of aluminum plate with ceramics is at least larger than 9.7 kg/cm.

Experiment 18 using the mentioned method in experiment 1, a ceramic plate coated with aluminum film on the surface is obtained. Overlap two ceramic plates coated with aluminum film together and then place the Al-12 wt % Si brazing filler metal between the two plates. After placing Al-12 wt % Si brazing filler metal on both sides of the two plates, place the two plates between the aluminum plates. All other experimental conditions are the same with experiment 1.

The experiment was repeated three times. No defects are found in the connection interface after brazing and the fractures during the peeling strength tests happen at the clamping part of the aluminum plate. The peeling strength is larger than 10.5 kg/cm, which indicates that the bonding strength of aluminum plate with ceramics is at least larger than 10.5 kg/cm.

Experiment 19 the experiment method is same with experiment 18. The difference is that solid phase diffusion welding is used to connect the ceramics together. The detailed difference is described as following: changing the Al-12 wt % Si brazing filler metal to pure aluminum, and decreasing the temperature to 650° C., which is under the melting temperature of aluminum. Carry on solid phase diffusion welding by exerting 5 MPa pressure on the samples using the thermo-compression installment heated in nitrogen atmosphere and prolong the time of heat preservation to 60 min.

The experiment was repeated three times. Except the deformation of aluminum plate because of pressure, no defects are found in the connection interface after brazing and the fractures during the peeling strength tests happen at the clamping part of the aluminum plate. The peeling strength is larger than 5.3 kg/cm, which indicates that the bonding strength of aluminum plate with ceramics is at least larger than 5.3 kg/cm.

Experiment 20 the experiment method is same with experiment 18. The detailed difference is described as following: in the process of forming the aluminum film on the connecting interface of ceramics, change the molten aluminum to molten Al-12 wt % Si alloy, and change the temperature to 600° C. No brazing filler metal is added when connecting the ceramics with ceramics or connecting ceramics with aluminum plate.

The experiment was repeated three times, no defects are found in the connection interface after brazing and the fractures during the peeling strength tests happen at the clamping part of the aluminum plate. The peeling strength is larger than 9.5 kg/cm, which indicates that the bonding strength of aluminum plate with ceramics is at least larger than 9.5 kg/cm.

Embodiment 3

Continuous Brazing of Ceramics with Aluminum

The commercially pure aluminum, the 5AO2 aluminum alloy, the 2AO2 aluminum alloy, the Al-20 wt % Si alloy, the commercially pure magnesium and all of the ceramic plates used in the embodiments are obtained commercially. The aluminum alloy used to form liquid film on the faying surface of ceramics is prepared by melting the pure aluminum, the Al-20 wt % Si alloy, and the pure magnesium.

Figure 2:
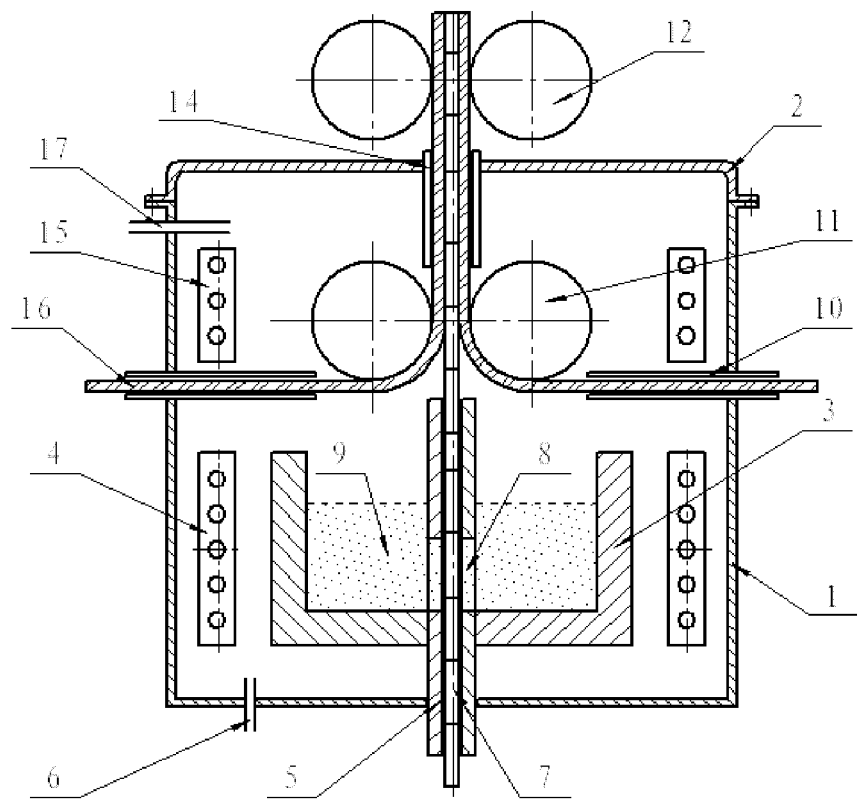
FIG. 2 is a schematic drawing of the structure of the ceramic-surface metallization-bonding apparatus used in example 3.

The structure of the ceramic-surface-metallization-brazing apparatus adopted in the embodiment is shown in FIG. 2. The apparatus consisting of a furnace body 1, a furnace cover 2, a graphite crucible 3, a lower metal resistance wire heater 4, a graphite guide 5, a lower inert gas inlet 6, a guide window 8, an aluminum strip inlet 10, a guide roller 11, a driving roller 12, a brazed work piece outlet 14, an upper metal resistance wire heater 15 and an upper inert gas inlet 17; the brazed body of aluminum and ceramics is labeled 13.

wherein the graphite crucible is placed at the lower part of the furnace body, the lower metal resistance wire heater is placed around the graphite crucible, both the graphite crucible and the furnace body have a hatch matching to the guide in the bottoms thereof respectively, and two hatches are coaxial; the graphite guide is arranged between the graphite crucible and the furnace body via the hatches, and securely connected with them respectively; the graphite guide is made of two parallel plates with a groove inside thereof for the ceramic plate to pass through, and is arranged with the guide window 8 thereon at a place within the crucible, for the contacting of the ceramic plate 7 to molten aluminum alloy in the crucible.

The gap between the ceramic plate and the guide under the window is 0.1 mm. This gap size can guarantee the smooth movement of the ceramic plate inside the guide, but aluminum liquid cannot leak out. The gap between the guide and the ceramic plate above the window is 1.3 mm. This gap size can guarantee that the aluminum liquid adhered to the ceramic plate will not contact with the guide so that the aluminum liquid can solidify unaffectedly.

Aluminum strips 16 enter into the furnace through the inlets at the both side of the apparatus. With the help of the guide roller 11, the aluminum strips are placed on both sides of the ceramic plate adhered with aluminum alloy liquid film at both sides. Drived by the driving roller 12 and the push of the ceramic plate, the bonded workpieces move out through the outlet 14 at the furnace cover. The contact pressure of the driving roller with the aluminum strip can be adjusted by adjusting the gap between the two guide rollers or the two driving rollers. The temperature of the lower and upper heater can be adjusted independently. In order to prevent the oxidation of graphite, the joint between the furnace body and the furnace cover is sealed by silicone and the furnace is purged by nitrogen gas.

Experiment 1

The ceramic-surface-metallization-brazing apparatus was adopted. Al-12 wt % alloy was charged into the graphite crucible and alumina ceramic plates (137 mm in length, 35 mm in width, 0.64 mm in thickness, produced by Tsinghua Yueke com, the purity is greater than 95%) was inserted into the graphite guide traversed through the crucible. The aluminum strips, 0.5 mm in thickness, were introduced from the strip inlets, after passing through the guide rollers and the driving rollers, they were educed from the outlet. Aluminum alloy was heated in a nitrogen atmosphere (the nitrogen flow rate is 20 Liters/min) to melt down and then was heated to 730° C. Another alumina plate was inserted into the guide from the entrance of the guide at the bottom of the apparatus at a speed of 68.5 mm/min. to push the ceramic plates inserted in the guide previously to move vertically at the same speed. During the moving, the ceramic plates contacted with aluminum alloy melt in the crucible through the windows on the guide and then they were pushed out from the upper part of the guide, with the together with the aluminum melt adhered on the surface. After the ceramic plate enters into guide roller, it will contact with aluminum strips. During the further movement, the liquid film adhered on the surface of ceramics will react with aluminum strips, and adhere to the strips and braze the strips on the ceramics and remove out from outlet. The temperature of the is set to 600° C., and it is higher than the molting temperature of Al-12 wt % alloy (600° C.), but lower than the melting point of pure aluminum (660° C.).

A metallographic specimen was cut off from the sample by using a diamond cutting machine. The microscopic observation reveals that the aluminum plates are brazed tightly on the ceramic plate, and no unbonded region is found. A 5 mm wide test bar was Cut off from the sample, and a 90° peeling strength test was performed. The peeling strength of the test bar is 14.1 kg/cm, and fracture occurs in the clamping part of aluminum plate, which indicates that the interface bonding strength is larger than the value, which indicates that a ceramic can be brazing tightly to aluminum by adopting the process.

The experiment was repeated three times. The break of the peeling test bars all happened at the clamping part of the aluminum, and the peeling strength measured was higher than 14.1 kg/cm, 13.3 kg/cm, 13.3 kg/cm respectively, which mean that the bonding strength of the interface is at least larger than 13.3 kg/cm.

Experiment 2

Except setting the temperature of the upper heater to be 620° C., all other experiment conditions are same with experiment 1. The observation and analysis of the metallographic sample show that the aluminum plate is tightly connected with the ceramic plate. And no unconnected defect is found. The peeling strength is 11.8 kg/cm, and fracture happens in the clamping part of aluminum plate. The experiment was repeated three times. The results indicate that the interface bonding strength is at least larger than 10.6 kg/cm.

Experiment 3

Except changing the alloy to Al-12 wt % Si-0.5 wt % Mg alloy, and decreasing the upper and lower nitrogen flow rate to 10 L/min, all other experiment conditions are same with experiment 1. The observation and analysis of the metallographic sample show that the aluminum plate is tightly connected with the ceramic plate. And no unconnected defect is found. Fracture happens in the clamping part of aluminum plate. The experiment was repeated three times. The results indicate that the interface bonding strength is at least larger than 9.5 kg/cm.

Experiment 4

Except changing the alumina ceramics to aluminum nitride ceramics, all other experiment conditions are same with experiment 1. The observation and analysis of the metallographic sample show that the aluminum plate is tightly connected with the ceramic plate. And no unconnected defect is found. Fracture happens in the clamping part of aluminum plate. The experiment was repeated three times. The results indicate that the interface bonding strength is at least larger than 9.3 kg/cm.

Similarly, although the embodiment only uses pure aluminum as experimental materials, the brazing of pure aluminum has no essential difference with that of aluminum alloy. Thus this method can be used in the brazing of other aluminum alloy components or materials. The only limit is that the melting temperature of the aluminum alloy components or materials must be higher than the melting temperature of the aluminum alloy filler metal.

INDUSTRIAL APPLICABILITY

Firstly, this invention solved the problem that the surface of ceramics is not easy to be coated with aluminum film. The applicants of the invention have carried on a great deal of research, and found that by first immersing the surface of ceramics to be metalized into molten aluminum or aluminum alloy and moving in it, so that the aluminum or aluminum alloy being firmly adhered to the metalizing surface of the ceramics. Then removing the ceramics out slowly from the molten aluminum or aluminum alloy in 3 ppm-1300 ppm (ppm: parts per million) atmosphere or 10-3 Pa vacuum environment, and cooling, a firmly adhered aluminum or aluminum alloy film can be formed on the ceramics surface. This film is formed by unaffected solidification of the continuous liquid film of aluminum or aluminum alloy adhered evenly on the ceramics surface, and does not have microscopic defects such as inclusions of oxide film and porosity inside, thus has the sound physical and mechanical properties of pure aluminum.

Comparing to the present techniques, the process of forming aluminum or aluminum alloy film on ceramics surface of this invention makes it possible to adhere aluminum or aluminum alloy film with the thickness of 1 micron to tens micron on the ceramics surface.

Figure 3:
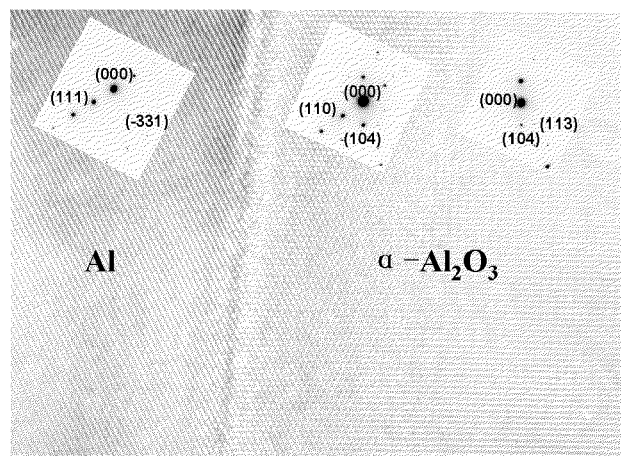
FIG. 3 shows high resolution transmission electron microscopy images and the micro diffraction pattern of the interfacial region of the joint of aluminum and an alumina ceramic.
Figure 4:
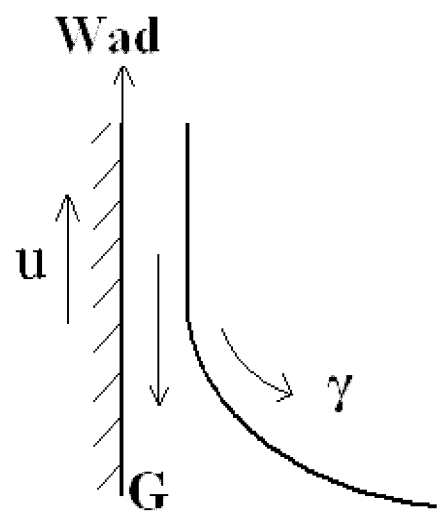
FIG. 4 shows the force acted on the liquid film.

Secondly, this invention has further solved the problem that the primary oxide film on the aluminum surface hinders the connection of aluminum with ceramics and declines the properties of the connecting body. FIG. 3 shows a high-resolution transmission electron microscopy images and electron diffraction images of each micro area at the interface of connecting body of alumina ceramics and aluminum prepared by the process of the invention. It can be seen from the images that this interface has no amorphous state oxide inclusion which originates from the primary oxide film on the aluminum surface and universally exists at the interfaces formed by of ordinary brazing process [about the oxide inclusion at the interface formed by ordinary brazing process can refer to the following references: X. S. Ning, K. Suganuma, M. Morita and T. Okamoto, Interfacial reaction between silicon nitride and aluminum, Philosophical Magazine letter, Vol 55, (1987), 93-96; E. Saiz; A. P. Tomsia; K. Sugamuma, Wetting and strength issues at Al/alumina interfaces, Journal of European Ceramic Society, Vol 23 (2003)2787-2796], which indicates that this invention has effectively removed the primary oxide film on the aluminum surface. It also can be seen from the images that aluminum reacts with alumina and then a coherent boundary layer is formed (the (104) plane of the alumina layer formed at the interface is coherent with the (104) plane of a crystal grain of the original alumina ceramics; and the (110) plane is half coherent with the (111) plane of aluminum), and the aluminum grows with the ceramics on the atomic scale. Theoretical calculation has indicated that the coherent interface of aluminum and alumina has lower interfacial free energy and the very high binding force [W. Zhang; J. R. Smith; Nonisochiometric Interfaces and Al2O3 Adhesion with Al and Ag, Physical Review Letters, Vol 85 (2000) 3225-3228]. The results of this research show that by using the process of this invention, the formation of the oxide inclusion at the interface can be avoided and the aluminum or aluminum alloy thin film can directly grow on the ceramics surface. Therefore, it is firm and not easy to peel off. The process of the invention is simply applicable and time and labor-saving, thus has a high industrial applicability.

In order to take full advantage of the applicants' research, this invention adopts the following technical processes:

The first technical process comprises: inserting the ceramics into molten aluminum alloy and moving in it to remove the primary oxide film on the surface of aluminum. Then removing the ceramics out from the molten aluminum alloy in a atmosphere containing 3 ppm-1300 ppm (ppm: parts per million) oxygen or a 10-3 Pa vacuum environment, and then cooling, to solidify the aluminum alloy liquid film adhered on the surface of the ceramics, and to form a firmly attached aluminum alloy film on the ceramics surface. Then use this aluminum alloy film as filler metal for brazing, to braze the ceramics with aluminum or aluminum alloy firmly. The thin film formed on the ceramic surface first has many advantages such as no oxide inclusion at the connecting interface, no porosity and other micro defects inside the film, and it attaches to ceremics stably. On the other hand, this stable thin film formed on the surface of ceramics does not deteriorate during brazing and the thickness of the film ranges from several microns to tens of microns, which is exactly consistent with the needed thickness of filler metal for brazing, thus the thin film can be directly used in the brazing of ceramics with aluminum or aluminum alloy components. The 90° peeling strength test shows that the bonding strength of the interface of ceramics with aluminum or aluminum alloy can exceed 6.5 kg/cm, which indicates that the interface is quite firm. In addition, as no excessive pressure is needed in the process of brazing, this invention can be used in the connection of components with complex shapes and can guarantee the working accuracy. The process and the apparatus of the techniques of the invention are simple and it is easy to be adopted in industrial production. These advantages are irreplaceable by the other existing techniques. Therefore, the process of the invention has broad application prospect in the connection of ceramics with aluminum or the aluminum alloy components.

The second technical process comprises: inserting the ceramics into molten aluminum alloy and moving in it to remove the primary oxide film on the surface of aluminum. Then removing the ceramics out from the molten aluminum alloy in a atmosphere containing 3 ppm-1300 ppm (ppm: parts per million) oxygen or a 10-3 Pa vacuum environment, and then cooling, to solidify the aluminum alloy liquid film adhered on the surface of the ceramics, and to form a firmly attached aluminum or aluminum alloy film on the ceramics surface. Then, laminating a filler metal on the aluminum or aluminum alloy film and then brazing ceramics with aluminum or aluminum alloy firmly by the filler metal, or brazing the ceramic plate coated with aluminum or aluminum alloy film with each other. The thin film formed on the ceramic surface first has many advantages such as no oxide inclusion at the connecting interface, no porosity and other micro defects inside the film, and it attaches to ceremics stably. On the other hand, by using the ordinary aluminum brazing process, to brazing the ceramics coated with aluminum or aluminum alloy film with each other or brazing the ceramics with aluminum or aluminum alloy components, the 90° peeling strength can exceed 12 kg/cm, and the fracture does not happen at the interface, which indicates that the process of the invention can actualize the high-strength connection of ceramics with aluminum or aluminum alloy. It is obvious that benefit of the invention can not be replaced by the other existing techniques. Moreover, the process and the apparatus of the techniques of the invention are simple and it is easy to be adopted in industrial production. Therefore, has a broad application prospect in the connection of ceramics and the connection of ceramics with aluminum or the aluminum alloy components.

The third technical process comprises: inserting the ceramics into molten aluminum alloy and moving in it to remove the primary oxide film on the surface of aluminum. Then removing the ceramics out from the molten aluminum alloy in a atmosphere containing 3 ppm-1300 ppm (ppm: parts per million) oxygen or a 10-3 Pa vacuum environment, and then cooling, to solidify the aluminum alloy liquid film adhered on the surface of the ceramics, and to form a firmly attached aluminum alloy film on the ceramics surface. Then, directly using the liquid film as filler metal to firmly braze the ceramics with aluminum or aluminum alloy components or materials. Comparing to the existing techniques, this invention has some outstanding advantages as following:

It can effectively avoid the formation of the inclusion of primary oxide film at the interface of liquid film and ceramics, thus the aluminum alloy can react completely with ceramics so that the formation of the unbonded defects at the interface can be prevented;

No oxide inclusion forms inside the liquid aluminum alloy film adhered on the faying surface of ceramics, thus can be directly used in the brazing of ceramics with aluminum or aluminum alloy components;

There is no strict limits to the shapes of the ceramics and the aluminum or aluminum alloy components or materials, thus has an universality;

No excessive pressure that can cause the deformation of aluminum or aluminum alloy components is needed, so that the connecting accuracy can be guaranteed;

The liquid film adhered to the surface of ceramics is used directly as filler metal, and the components can be connected by only being placed on the liquid film, which facilitates the continuous production. Therefore, the process of the invention has broad application prospect in the connection of ceramics with aluminum or the aluminum alloy components.

Alumina ceramics, silicon nitrid ceramics, aluminum nitrid ceramics and silicon carbide ceramics were used in the embodiment of the invention, and expectant results have been acquired. Since the bonding of aluminum to a ceramic depends on the reaction of the ceramic and aluminum; and according to the thermodynamics, aluminum can also react with other oxide, nitride, carbide, boride, silicate, silicon, graphite and other non-ferrous material, it is obvious that the invention does restrict to the 4 kind of the ceramic material.

What is claimed:

1. A process for attaching an aluminum or aluminum alloy thin film to a ceramic surface, comprising:
   immersing the ceramic surface to be metalized into an aluminum or aluminum alloy melt, and making the ceramic move or stay still relative to the melt to adhere the melt of the aluminum or aluminum alloy to the metalizing surface of the ceramic; and
   then removing the metalizing surface of the ceramic upward from the melt in an atmosphere comprising oxygen, to drain extra melt and to attach a thin aluminum or aluminum alloy liquid film with a fixed thickness of from one micrometer to tens of micrometers on the metalizing surface of ceramic, and then unaffectedly cooling and solidifying the aluminum or aluminum alloy liquid film adhered thereto to obtain a ceramic having a thin aluminum or aluminum alloy thin film attached to its surface.

2. The process according to claim 1, wherein said immersing the metalizing surface of the ceramic into the aluminum or aluminum alloy melt comprises inserting the ceramic into a vessel containing the aluminum or aluminum alloy melt from the bottom thereof and then moving the ceramic upward vertically.

3. The process according to claim 1 wherein the aluminum or aluminum alloy melt has a temperature of 630° C.-850° C.

4. The process according to claim 3 wherein the aluminum or aluminum alloy melt has a temperature of 730° C.-820° C.

5. The process according to claim 1 wherein said making the ceramic move or stay still relative to the melt comprises in the movement relative to the melt, a speed of moving relative to the melt is 10-68.5 mm/min; and a speed of removing the metalizing surface of the ceramic from the melt is 10-68.5 mm/min; and
   in the staying still relative to the melt, a time for staying still relative to the melt is 5-60 min; and a speed of removing the metalizing surface of the ceramic from the melt is 10-274 mm/min.

6. The process according to claim 5 wherein said making the ceramic move or stay still relative to the melt comprises:
   in the movement relative to the melt, a speed of moving relative to the melt is 68.5 mm/min, and a speed of removing the metalizing surface of the ceramic from the melt is 68.5 mm/min; and
   in the staying still relative to the melt, a time for staying still relative to the melt is 10 min, and a speed of removing the metalizing surface of the ceramic from the melt is 10 mm/min.

7. The process according to claim 5 wherein said making the ceramic move or stay still relative to the melt comprises:
   in the movement relative to the melt, a speed of moving relative to the melt is 10-68.5 mm/min, and a speed of removing the metalizing surface of the ceramic from the melt is 68.5 mm/min; and
   in the staying still relative to the melt, the time for staying still relative to the melt is 5-60 min.

8. The process according to claim 1, wherein the process is conducted in an atmosphere as described in 1) or 2) below:
   1) at about $10^{-3}$ Pa; or
   2) an inert gas with oxygen or nitrogen gas with oxygen, wherein the oxygen with said inert gas or said nitrogen has an amount of, by volume, 3 ppm-1300 ppm, wherein ppm refers to parts per million.

9. The process according to claim 8 wherein the process is conducted in an atmosphere of inert gas or nitrogen gas with oxygen, wherein the oxygen has an amount, by volume, of 10 ppm-700 ppm.

10. The process according to claim 1, wherein the aluminum alloy is Al-8 wt % Si, Al-12 wt % Si, Al-2 wt % Si, Al-1 wt % Si or Al-12 wt % Si-1 wt % Mg.

11. The process according to claim 1, wherein the ceramic is oxide ceramic, nitride ceramic or carbide ceramic; or, the oxide ceramic is an alumina ceramic plate, the nitride ceramic is an aluminum nitride ceramic plate or silicon nitride ceramic plate, the carbide ceramic is a silicon carbide ceramic plate.

12. The process according to claim 1, wherein the aluminum or aluminum alloy thin film has a thickness of 1 μm-51 μm.

13. The process according to claim 12 wherein the aluminum or aluminum alloy thin film has a thickness of 4 μm-51 μm.

14. The process according to claim 12, wherein the aluminum or aluminum alloy thin film has a thickness of 1 μm-7 μm.

15. A process for bonding a metal to a ceramic, comprising:
   a) immersing the ceramic to be metalized into an aluminum or aluminum alloy melt, and making the ceramic move or stay still relative to the melt to adhere the melt of the aluminum or aluminum alloy to a metalizing surface of the ceramic;
   b) removing the metalizing surface of the ceramic upward from the melt in an atmosphere comprising oxygen, to drain extra melt and to attach a thin aluminum or aluminum alloy liquid film on a surface of the ceramic, forming a dense aluminum or aluminum alloy thin film with a thickness from several micrometers to tens of micrometers, to obtain a ceramic having a surface for bonding covered by the aluminum or aluminum alloy thin film; and
   c) attaching a metal to the ceramic having the surface for bonding covered by the aluminum or aluminum alloy thin film by using the aluminum or aluminum alloy thin film, or bonding the ceramic having the surface for bonding covered by the aluminum or aluminum alloy thin film to each other by using the aluminum or aluminum alloy thin film.

16. The process according to claim 15 wherein c) is conducted by the following procedures described in I, or II, or III, or IV:
   I. c) is conducted by the process including the following:
   placing a brazing filler on the aluminum or aluminum alloy thin film of the ceramic having the surface for attaching covered by the aluminum or aluminum alloy thin film, then placing the metal on the brazing filler, brazing to attach the metal to the ceramic having the surface for attaching covered by the aluminum or aluminum alloy thin film;
   II. c) is conducted by the process including following:
   placing a brazing filler on the aluminum or aluminum alloy thin film of the ceramic having the surface for attaching covered by the aluminum or aluminum alloy thin film, then placing a ceramic having the surface for attaching covered by the aluminum or aluminum alloy thin film on the brazing filler, brazing to attach the ceramics having the surface for attaching covered by the aluminum or aluminum alloy thin film to each other;

III. c) is conducted by the process including the following:
using the aluminum or aluminum alloy thin film as brazing filler to attach a metal to the ceramic having the surface for attaching covered by the aluminum or aluminum alloy thin film; and IV. c) is conducted by the process including following:
using the aluminum or aluminum alloy thin film as brazing filler to attach the ceramic having the surface for attaching covered by the aluminum or aluminum alloy thin film to each other.

17. The process according to claim 15, wherein in c), the temperature for the brazing is 600° C.-650° C.;
and/or, in c), in the process I or II, the brazing filler is Al-12 wt % Si alloy, Al-8 wt % Si alloy, Al-4 wt % Si alloy, Al-8 wt % Si-0.2 wt % Mg alloy or aluminum;
and/or, in c), the metal is aluminum, 5A02 aluminum magnesium alloy or 2A02 aluminum copper magnesium alloy;
and/or, in c), the brazing is conducted in a vacuum atmosphere of $10^{-3}$ Pa order or in an atmosphere with an inert gas.

18. A process for attaching aluminum or aluminum alloy to a ceramic, comprising:
a) immersing the ceramic into a first aluminum alloy melt, and making the ceramic move or stay still relative to the melt to adhere the melt of the first aluminum alloy to a metalizing surface of the ceramic;
b) removing the metalizing surface of the ceramic upward from the melt in an atmosphere comprising oxygen, to drain extra melt and to attach a thin liquid film of the first aluminum alloy to a surface of the ceramic; and
c) contacting pure aluminum or a second aluminum alloy with the liquid film of the first aluminum alloy attached to the ceramic, and using the liquid film of the first aluminum alloy as a brazing filler to braze the ceramic to the pure aluminum or the second aluminum alloy.

19. The process according to claim 18, wherein a temperature for brazing is higher than the melting temperature of the first aluminum alloy and lower than the melting point of pure aluminum, or a temperature for brazing is higher than the melting temperature of the first aluminum alloy and lower than the melting temperature of the second aluminum alloy.

* * * * *